(12) United States Patent
Suzuki et al.

(10) Patent No.: US 6,434,595 B1
(45) Date of Patent: Aug. 13, 2002

(54) METHOD OF EXECUTING MOBILE OBJECTS AND RECORDING MEDIUM STORING MOBILE OBJECTS

(75) Inventors: Toshihiro Suzuki; Kazuhiro Minami, both of Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/200,108

(22) Filed: Nov. 25, 1998

(30) Foreign Application Priority Data

Nov. 26, 1997 (JP) .............................................. 9-324945

(51) Int. Cl.[7] .......................... G06F 15/16; G06F 15/18
(52) U.S. Cl. ....................................... 709/202; 709/317
(58) Field of Search ................................... 709/202, 317

(56) References Cited

U.S. PATENT DOCUMENTS 5,603,031 A * 2/1997 White et al. ................. 709/317
6,233,601 B1 * 5/2001 Walsh ......................... 709/202

* cited by examiner

*Primary Examiner*—Dung C. Dinh
(74) *Attorney, Agent, or Firm*—David M. Shofi; Anne Vachon Dougherty

(57) ABSTRACT

A concrete activity defining a job to be executed in each place is carried on a carrier agent for movement to different computer distributed locations. The substances of the mobile objects hold a proxy activity which sends out an instruction to execute to the concrete activity held by the carrier agent. The substances of the mobile objects additionally send out an instruction to execute to the concrete activity for moving to different locations.

8 Claims, 33 Drawing Sheets

METHOD OF EXECUTING MOBILE OBJECTS AND RECORDING MEDIUM STORING MOBILE OBJECTS

FIELD OF THE INVENTION

This invention relates to a mobile agent technology for moving a mobile agent to a remote server on a network and forming an instruction in the remote server in a distributed computer environment and, particularly to a system for moving a mobile agent to a remote server.

BACKGROUND OF THE INVENTION

There has been a mobile agent technology for moving a mobile agent to a remote server on a network to form an instruction in a distributed computer environment (PUPA 7-182174 (U.S. Pat. No. 5,603,031), PUPA7-509799 (International Application Number: PCT/US94/07397, International Publication Number: W097/02219), Fumihiko Nishida, Susumu Fujiwara, et al "Latest Internet Technology, Nikkei Communication, separate volume" pp 104–117, Nikkei BP Co.).

Such mobile agent comprises two basic elements which are "mobile agent" and "place". The mobile agent can move around places existing on the network while maintaining its internal state. The mobile agent can contact another agent (a mobile agent or a non-mobile agent) in a place to receive a necessary service. The "place" is a place provided by a server existing on the network where the agent moves to, supports a contact between agents, and absorbs the difference between hardwares and between platforms.

Such mobile agent technology enables a mobile agent to execute jobs which have been so far done by a human being, such as to adjust setting of an internal conference depending on a schedule of employees or a reservation status of a conference room and to obtain desired information distributed on the network.

There is a technology of classifying complex behavior of a mobile agent into basic behavior patterns, providing a template (moderator template) which enables a desired behavior pattern of the mobile agent to be defined, and controlling an activity of issuing a request in each place around which the mobile agent wanders as a predecessor (an activity working in a previous place) and a successor (an activity working in the next place), as disclosed in Japanese patent application 9-92091 filed by the applicant of this application on Apr. 10, 1997 though not laid open at the time when this application is filed.

With this technology, however, the mobile agent would wander around places, while holding all activities defining a job to be executed in each place. The foregoing leads to the problems that the quantity of information is large when moving, the load on the network is too heavy, and an excessive memory area is occupied in each place.

In addition, because a model is applied only to a predetermined cooperation algorithm (plan), a flexible behavior can not be implemented, such as to re-assemble or add a job to be executed during movement after the mobile agent is released.

It is, therefore, an object of this invention to provide a mobile agent which allows a network load to be minimized during movement.

It is another object of this invention to provide a mobile agent which allows occupation of resources in each place to be minimized.

It is yet another object of this invention to provide a mobile agent which allows a job to be executed to be modified flexibly during movement.

It is still another object of this invention to shorten the required processing time from the time when a mobile agent is released until the result is returned.

SUMMARY OF THE INVENTION

In this invention, a concrete activity defining a job to be executed in each place is carried on a carrier agent for movement to each place. On the other hand, the substances of the mobile objects hold a proxy activity which sends an instruction to the concrete activity carried on the carrier agent to execute. The substances of the mobile objects circulate through places and send an instruction to execute to the concrete activity moving to each place.

In one mode of this invention, a method of executing mobile objects is provided for executing different jobs in different places distributed on a network, comprising the steps of; (a) generating a first carrier agent which holds a first concrete activity defining a job to be executed in a first place, (b) generating a second carrier agent which holds a second concrete activity defining a job to be executed in a second place, (c) generating substances of mobile objects which contain information specifying said first carrier agent and a second information specifying said second carrier agent, instruct said first carrier agent to execute said first concrete activity in said first place, and instruct said second carrier agent to execute said second concrete activity in said second place, (d) moving said first carrier agent to said first place, (e) moving said second carrier agent to said second place, (f) moving the substance of said mobile objects to said first place, (g) executing a job of said first concrete activity in said first place by having the substance of said mobile objects specify said first carrier agent and instruct said first concrete activity to execute the job, (h) moving the substance of said mobile objects to said second place, and (i) executing a job of said second concrete activity in said second place by having the substance of said mobile objects specify said second carrier agent and instruct said second concrete activity to execute the job.

In another mode of this invention, a method of executing mobile objects is provided for executing a job in at least one place distributed on a network, comprising the steps of; (a) generating a carrier agent which holds a concrete activity defining a job to be executed in said place, (b) generating substances of mobile objects which contain information specifying said carrier agent and instruct said carrier agent to execute said concrete activity in said place, (c) moving said carrier agent to said place, (d) moving the substance of said mobile objects to said place, and (e) executing a job of said concrete activity in said place by having the substance of said mobile objects specify said carrier agent and instruct said concrete activity to execute the job.

In another mode of this invention, a method of executing mobile objects is provided for executing a job in at least one place distributed on a network, comprising the steps of; (a) moving a carrier agent which holds a concrete activity defining a job to be executed in said place to said place, (b) moving the substance of mobile objects which contain information specifying said carrier agent and instruct said carrier agent to execute a job of said concrete activity in said place to said place, and (c) executing the job of said concrete activity in said place by having the substance of said mobile objects specify said carrier agent and instruct said concrete activity to execute the job.

In one mode of this invention, a recording medium is provided for storing at least a portion of mobile objects executing different jobs in different places distributed on a network, comprising; (a) a first carrier agent which holds a first concrete activity defining a job to be executed in a first place, (b) a second carrier agent which holds a second concrete activity defining a job to be executed in a second place, and (c) substances of mobile objects which contain information specifying said first carrier agent and a second information specifying said second carrier agent, instruct said first carrier agent to execute the job of said first concrete activity in said first place, and instruct said second carrier agent to execute the job of said second concrete activity in said second place.

In another mode of this invention, a recording medium storing mobile objects is provided for executing a job in places distributed on a network, comprising; (a) carrier agent which holds a concrete activity defining a job to be executed in said place, and (b) substances of mobile objects which contain information specifying said carrier agent and instruct said carrier agent to execute a job of said concrete activity in said place.

In one mode of this invention, a recording medium is provided for storing at least a portion of mobile objects executing different jobs in different places distributed on a network, comprising; (a) a first proxy activity which contain information specifying said first carrier agent which holds a first concrete activity defining a job to be executed in a first place, and instruct said first carrier agent to execute the job of said first concrete activity in said first place, (b) a second proxy activity which contains information specifying said second carrier agent which holds a second concrete activity defining a job to be executed in a second place, and instructs said second carrier agent to execute the job of said second concrete activity in said second place, and (c) an order list defining the order of execution of said first proxy activity and said second proxy.

In another mode of this invention, a recording medium is provided for storing mobile objects executing jobs in response to an instruction by substances of mobile objects including proxy activities arriving at a place distributed on a network, comprising; (a) a concrete activity defining a job to be executed in said place, (b) a concrete activity table provided to said proxy activity in order for said proxy activity to specify said concrete activity, and (c) a method for receiving an instruction message to execute the job from said proxy activity.

In another mode of this invention, a recording medium is provided for storing mobile objects executing jobs in response to an instruction by substances of mobile objects including proxy activities arriving at a place distributed on a network, comprising; (a) a concrete activity defining a job to be executed in said place, and (b) a method for receiving an instruction message to execute the job from said proxy activity.

BRIEF DESCRIPTION OF THE DRAWINGS

The invention will now be described with specific reference to the accompanying drawings wherein.

DESCRIPTION OF THE PREFERRED EMBODIMENT

Figure 1:
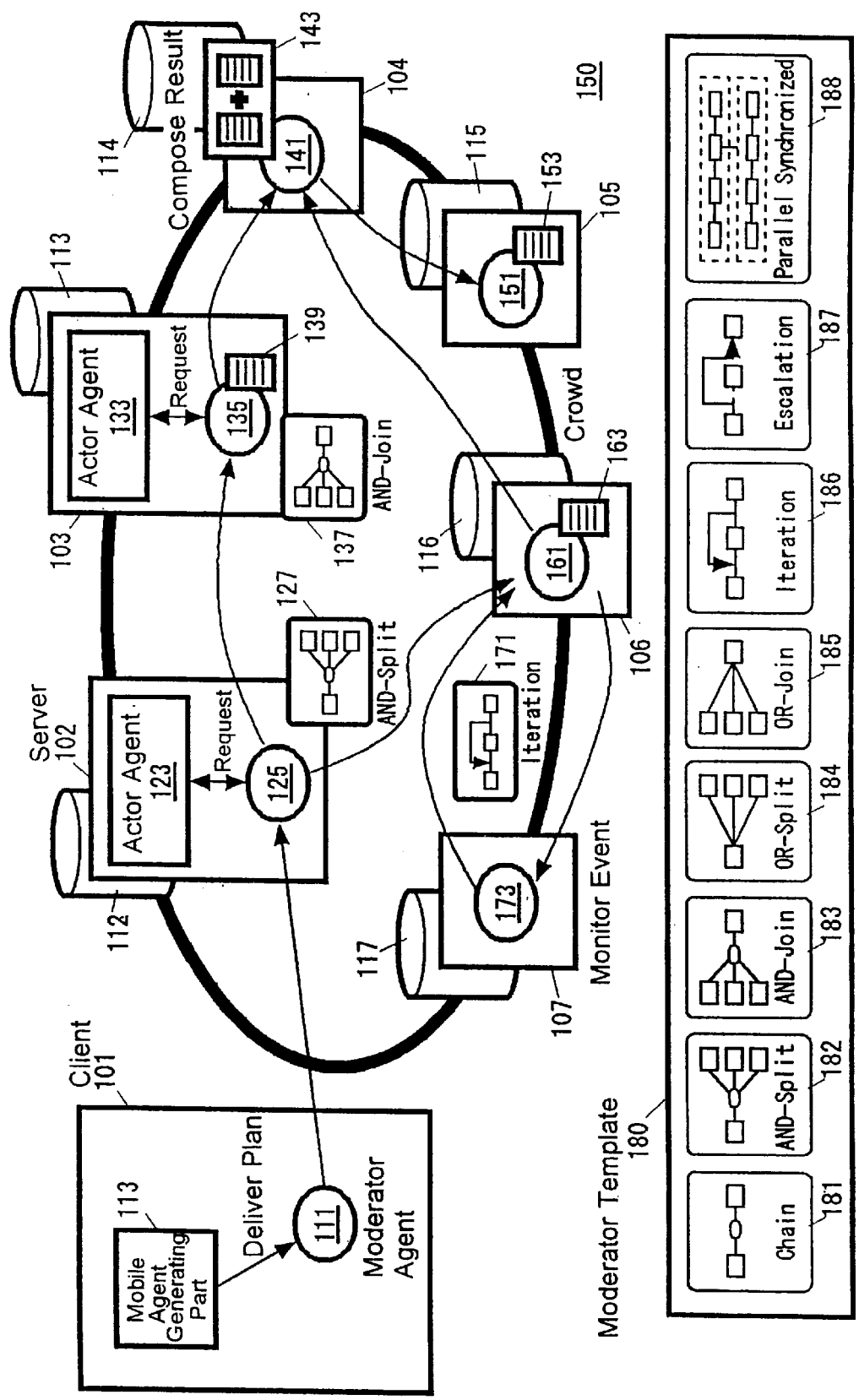
FIG. 1 is a diagram showing a distributed network environment in which a mobile agent generated by this invention operates.

FIG. 1 shows a distributed network environment 150 executing a mobile object which is generated in accordance with this invention. Each server 112–117 is provided with a place 102–107 where a service can be provided to mobile agents 125, 135, 141, etc. The places in the distributed network environment are called "a crowd." A mobile agent generating part 113 for generating a mobile agent exists in a client system 101. The mobile agent generating part 113 delivers a generated plan to a moderator agent 111 which, in turn, can move through a designated place by executing the plan.

The mobile agent 125, etc., can contact another agent (an agent contacting a mobile agent to provide a service is specifically called "an actor agent") existing in each place 102–107, send out a request, and receive the result of the request. The place supports a contact between agents. Also, the mobile agent 125, etc., can hold the result of the request received from an actor agent as "Result" 139, 143, 153, 163, continue to move and apply various works on the Result such as "composition" and "split" of the Result during movement.

Figure 2:
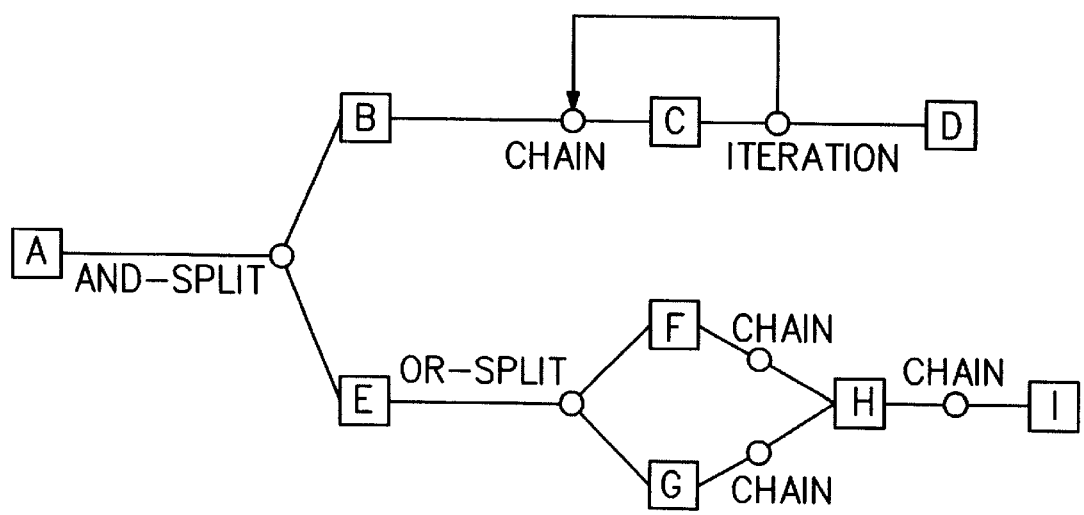
FIG. 2 is a diagram showing an example of a mode in which a mobile agent generated by this invention moves on the distributed network.

In this invention, movement, split and extinguishment of a mobile agent are controlled by moderator templates 181–187 and a user can simply define a complicated work including split and merge, as shown in FIG. 2, by combining various templates as required by the mode of processing.

B. Hardware Configuration

Figure 3:
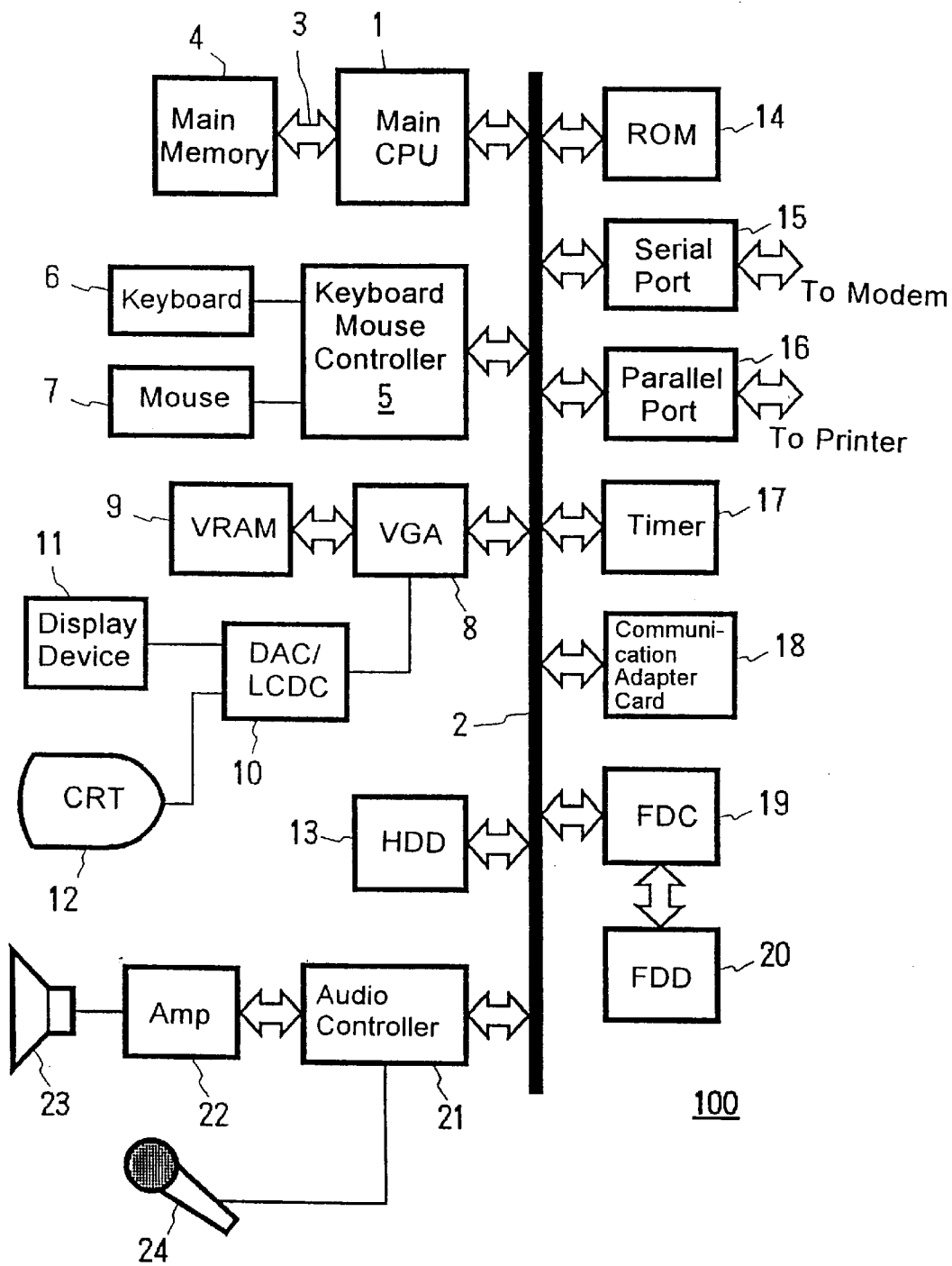
FIG. 3 is a schematic diagram of the hardware configuration of the mobile agent generating system in the preferred embodiment of this invention.

FIG. 3 shows a schematic diagram of a hardware configuration of a mobile agent generating system in a preferred embodiment of this invention. The mobile agent generating system 100 comprises a central processing unit (CPU) 1 and a memory 4. The CPU 1 and the memory 4 are connected to a hard disk device 13 as an auxiliary storage via a bus 2, etc. A floppy disk device 20 (or a medium drive device such as an MO, a CD-ROM, etc. 13, 26, 28, 29, 30) is connected to the bus 2 through a floppy disk controller 19 (or a controller such as an IDE controller 25, a SCSI controller 27).

A floppy disk (or a medium such as an MO, a CD-ROM, etc.) is inserted to the floppy disk device 20 (or a medium drive device such as an MO, a CD-ROM, etc. 26, 28, 29). A computer program code which gives instructions to the CPU and the like in cooperation with an operating system to practice this invention may be recorded in the floppy disk and a recording medium of the hard disk device 13, 30 and a ROM 14 and executed by being loaded in the memory 4. The computer program code may be compressed or divided into pieces for recording in a plurality of media.

Further, the mobile agent system 100 may be a system which is provided with a user interface hardware including a pointing device 7 (a mouse, a joystick and a track ball, etc.) for inputting screen position information, a keyboard 6 for supporting a key input and a display 11, 12 for presenting image data to the user. A speaker 23 receives an audio signal from an audio controller 21 via an amplifier 22 for output as a voice.

A GUI plan node library (to be described later) which is an input to the mobile agent generating system 100 of this invention is stored in the hard disk 30 and inputted to a database retrieval system 100 via the SCSI interface 27. It is also possible to communicate with other computers, etc., to obtain access to a database of another system or to obtain access to a database existing in a recording medium such as a floppy disk 24, etc., via a serial port 15 and a modem or a communication adapter 18 such as a token ring.

As such, it will be readily understood that this invention may be implemented by a conventional personal computer (PC), a workstation, a computer implemented in a home electric appliance, such as a television set or a facsimile machine, and a combination thereof. It should be noted, however, that these components are given for exemplary purpose and it is not meant that all of these components are the indispensable components of this invention. Specifically, because this invention is directed to generation of a mobile agent, those components including the serial port 15, the communication adapter card 18, the audio controller 21, the amplifier 22 and the speaker 23 are not indispensable to one mode of this invention.

As an operating system, those which support a GUI multi-window environment in default, such as Windows (trademark of Microsoft), OS/2 (trademark of IBM), X-WINDOW System (trademark of MIT) or AIX (trademark of IBM) are desirable but the operating system is not limited to any specific operating system environment.

While FIG. 3 shows a system in a stand alone environment, this invention may be implemented in a client/server system in which a client machine is LAN connected to a server machine via Ethernet and a token ring, etc. and the server machine side is provided with a plan split part, etc., to be described later with the rest of functions disposed in the client side. As such, it is a matter of discretion in the design to dispose what function in which of the server machine side and the client machine side. Various modifications of a combination of a plurality of machines, distribution of functions to these machines, etc., and implementation thereof are within the concept of this invention.

C. System Configuration

Figure 4:
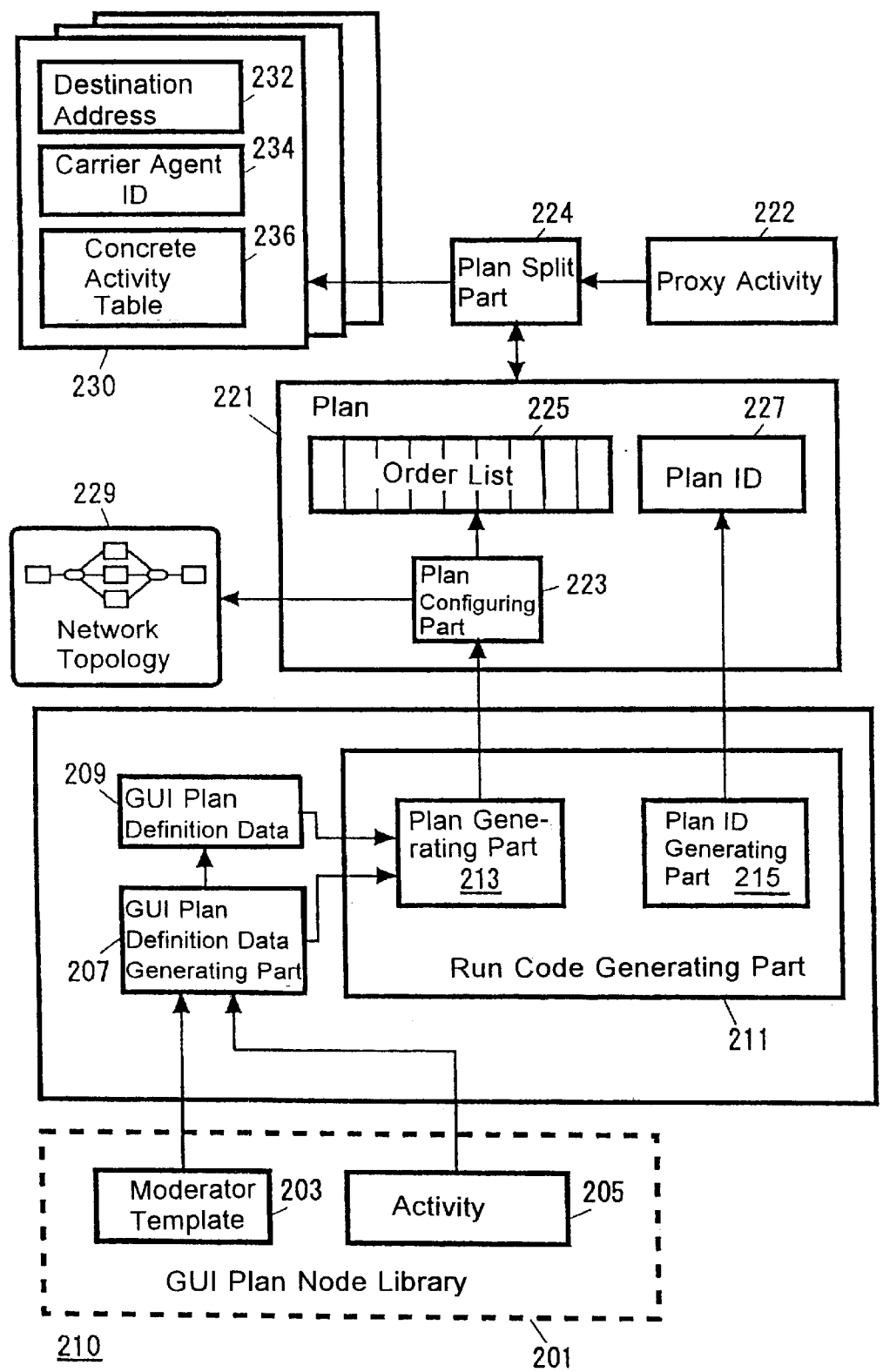
FIG. 4 is a functional block diagram showing an embodiment of processing elements in the mobile agent generating system of this invention.

The system configuration of the mobile agent generating system in the preferred embodiment of this invention is now described with reference to the block diagrams of FIG. 4 and FIG. 5. FIG. 4 is a functional block diagram showing an embodiment of the processing elements in the mobile agent generating system 210. A run code generating part 241 comprises a plan generating part 213 and a plan ID generating part 215. The plan ID generating part 215 allocates a plan ID which is unique on the network to a plan. In the preferred embodiment of this invention, the plan ID generating part 215 generates a plan ID by composing a URL of the internet, a port number, an agent ID (allocated to the mobile agent generating part) and a serial Number (the mobile agent generating part allocates each time a plan ID is generated).

The plan generating part 213 generates a moderator agent and a plan based on GUI plan definition data 209. The generated plan includes a plan configuring part 223 controlling information of a moderator template to be run and an activity, etc., and an order list 225 defining the order of the moderator templates and the activities. The plan configuring part 223 has information correlating the plan node object (a collective name of a moderator template and an activity) and forms a network topology 231.

A GUI plan definition data generating part 207 generates GUI plan definition data 209 using information of the GUI plan node library 201. The plan split part generates a carrier agent 230 for each place where the agent moved for forming a plan generated by a run code generating part 211. Also, the plan split part replaces an activity 205 (called a concrete activity to distinguish from the proxy activity to be described later) correlated to the order list with a proxy activity 222.

The proxy activity 222 includes a message to have the concrete activity 205 to be executed but does not include a code for executing a substantial job in the preferred embodiment of this invention. The carrier agent 230 is transferred to each destination place, waits arrival of the substance of the mobile objects 221 (conversely, there may be a case where the substance of the mobile objects 221 waits arrival of the carrier agent 230), and executes the concrete activity 205 in response to an instruction by the substance of the mobile objects.

Figure 5:
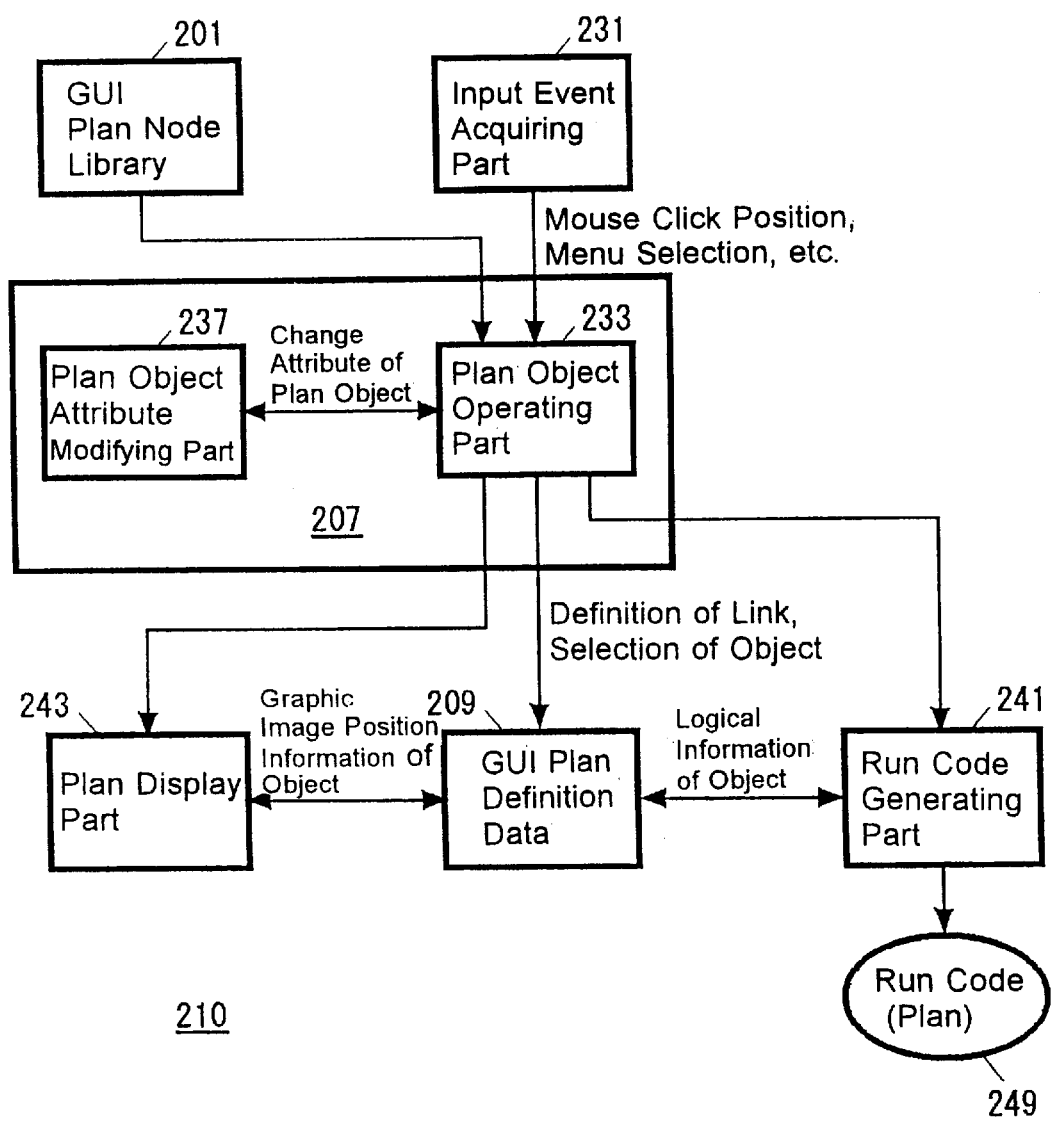
FIG. 5 is a functional block diagram of an embodiment of processing elements in the mobile agent generating system of this invention as seen from the GUI plan definition data generating part 207.

FIG. 5 is a functional block diagram of an embodiment of processing elements in the mobile agent generating part 210 as seen from the GUI plan definition data generating part 207. An input event acquiring part 231 which provides input information to the GUI plan definition data generating part 207 acquires an event such as a key input and a mouse click from the user and converts it to a message which can be interpreted by a plan object operating part 233 of the GUI plan definition data generating part 207 for delivery to the part 233.

The plan object operating part 231 generates an object such as a GUI activity and a GUI template and sets a property of objects depending on the kinds of the events. A plan object attribute modifying part 237 provides a dialog window for modifying the property of a specified object. Modified information is reflected to the GUI plan definition data 239 via the plan object operating part 231. A GUI plan definition data holding part 243 holds an activity constituting a plan, logical information of a template and graphic image information. A plan display part 245 displays the structure of a plan on the screen based on the graphic image information of the GUI plan definition data 243. A run code generating part 241 generates a run code 249 (plan) for generating a defined plan based on the logical information of the GUI plan definition data.

Figure 6:
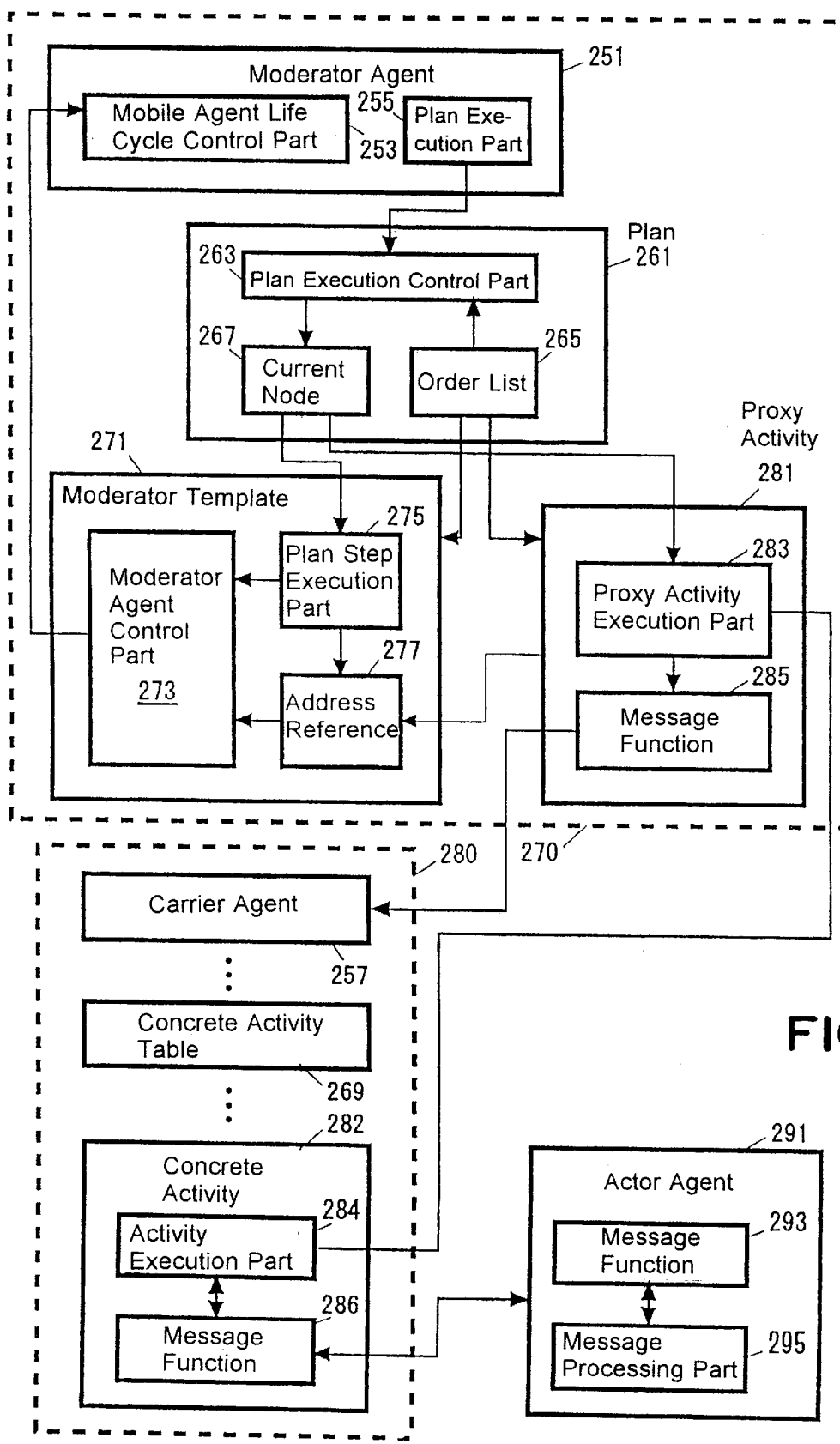
FIG. 6 is a functional block diagram showing an embodiment of processing elements during run time of the mobile agents generated by the mobile agent generating system of this invention.

FIG. 6 is a functional block diagram of an embodiment of a processing element upon running mobile agents 270, 280 which are generated by the mobile agent generating part 210. The substance of the mobile objects 270 include a moderator agent 251, a plan object 261, a moderator template 271 and a proxy activity 281. The moderator agent 251 includes a mobile agent life cycle control part 253 and a plan execution part 255, The mobile agent life cycle control part 253 executes movement, duplication and erasure, etc., of the substance of the mobile objects 270. The plan execution part 255 recognizes arrival at a new place and instructs a plan object 261 to execute the plan.

On the other hand, the plan object 261 includes a plan execution control part 263, a current node 267 and an order list 265. The plan execution control part 263, upon receiving an instruction from the plan execution part of a moderator agent to execute a plan, determines a plan node object 271, 281, to be currently executed with reference to the current node 267 and the order list 265, and requests the plan node objects 271, 281 to execute.

The current node 267 corresponds to a plan node iterator to be described later and monitors which plan node object is currently executed. The order list 265 is a list specifying a plan node objects 271, 281 to be executed. When a branch, etc., does not occur, the plan objects 271, 281 request the plan node to execute in the order of the order list 265.

The moderator template 271 includes a moderator agent control part 273, a plan step execution part 275 and an address reference part 277. The moderator agent control part 273 requests the mobile agent life cycle control part 253 of the moderator agent 251 to move, duplicate and erase the substance of the mobile objects 270. The plan step execution part 275 is differently defined depending on the kinds of the moderator template and controls instructions to be executed in a previous place or a next place. The address reference part 277 has a role of acquiring an address from the proxy activity 281 and telling the moderator agent control part 273 a destination address.

The proxy activity 281 includes a proxy activity execution part 283 and a message function 285. The proxy activity execution part 283 interacts with a carrier agent via the message function 285 to determine whether or not it is a carrier agent 280 having a concrete activity 282 corresponding to that proxy activity and instructs the corresponding concrete activity 282 to execute a job. The concrete activity table 269 is a table for specifying the concrete activity 282 to be executed.

The concrete activity 282 includes an activity execution part 284 and a message function 286. The activity execution part 284 has a function to store an instruction executed in places where a mobile agent moves around and a Result received in each place. The message function 286 has a function to exchange a message with the actor agent 291.

The actor agent 291 is another agent existing on a place and has a function to provide a service to a request by a concrete activity 282. The actor agent 291 also has a message function 293 to exchange a message with an activity and has a message processing part 295 for determining the content of the request and providing a service.

While each functional block shown in FIG. 4 to FIG. 6 has been described, these functional blocks are logical functional blocks and it is not meant that each of them is implemented by an integral hardware or software. They may be implemented by a consolidated or shared hardware or software. Also, it is not meant that all the functional blocks shown in FIG. 4 to FIG. 6 are indispensable components of this invention. For example, the order list 265 is not an indispensable component because the current node control part 267 may directly control a current node and a moderator agent acquiring other Result may be specified in ANDJoin processing. Further a run code can be generated by placing a run code generation part on another machine to which GUI plan definition data may be sent.

D. Object Configuration

D-1. Object Configuration of Mobile Agents

Figure 7:
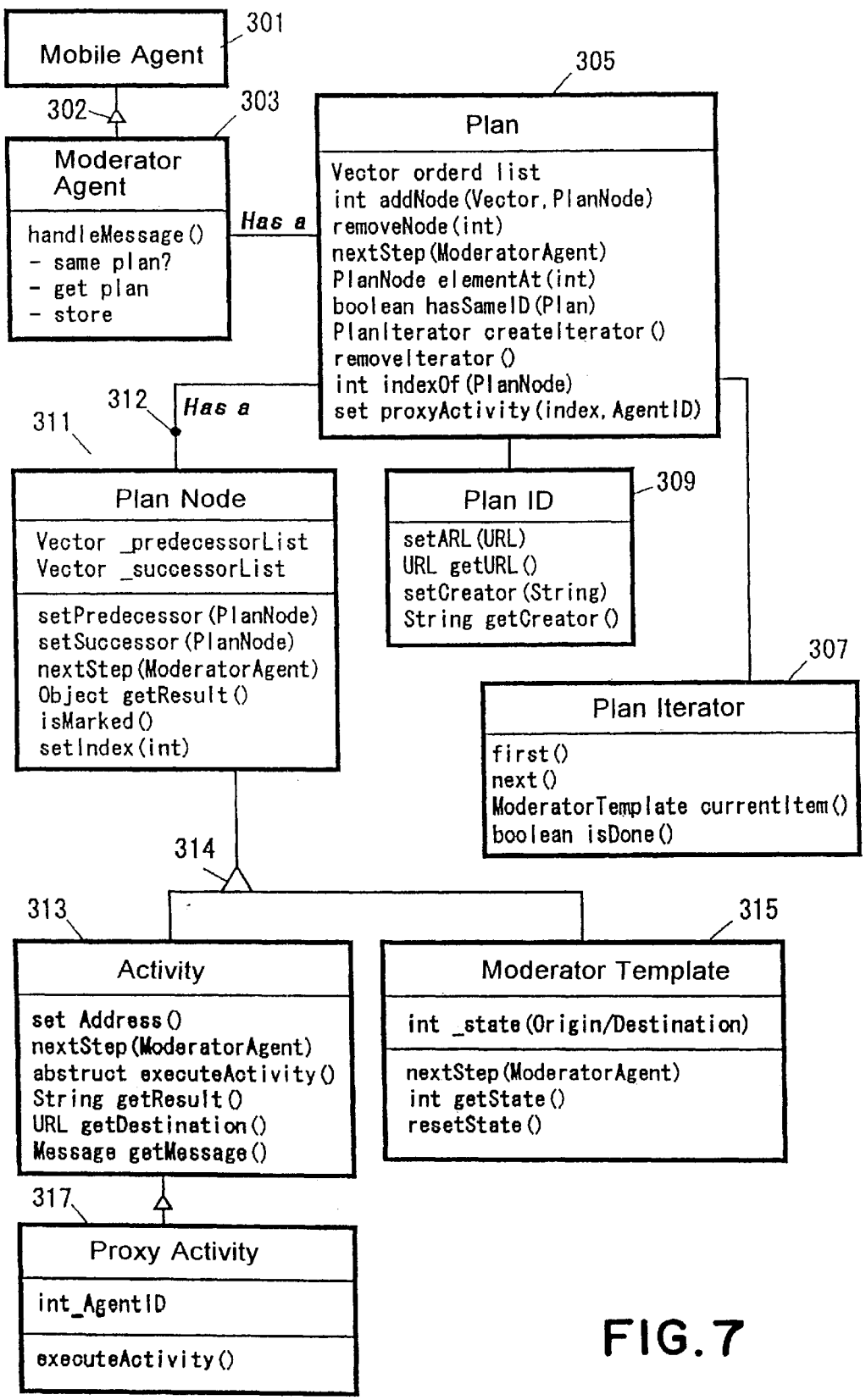
FIG. 7 is an object chart of the mobile agents generated in the preferred embodiment of this invention.
Figure 8:
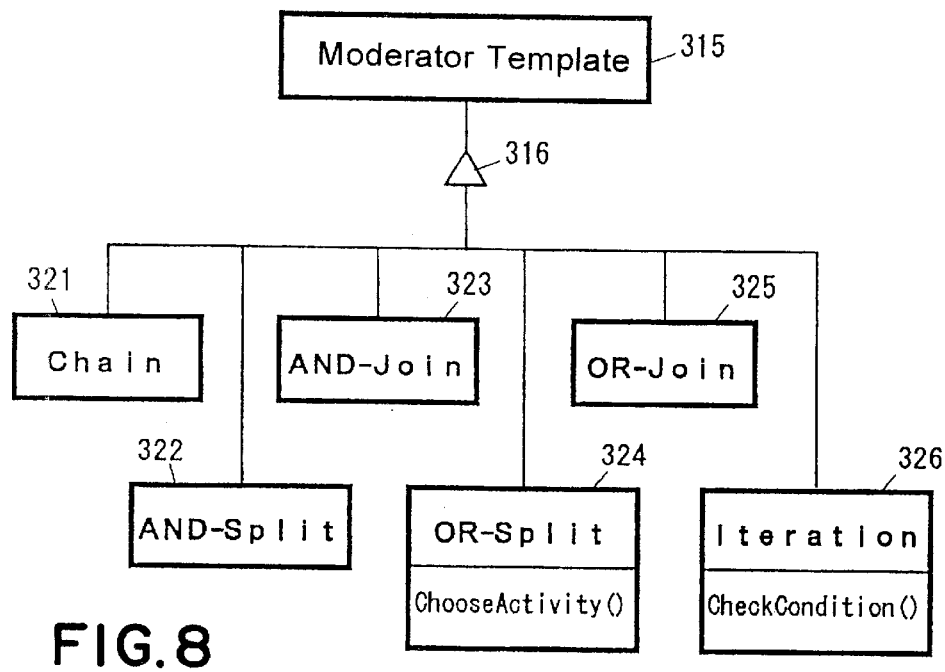
FIG. 8 is an object chart of the mobile agents generated in the preferred embodiment of this invention.

FIG. 7 and FIG. 8 are object diagrams of the mobile agents 270, 280 of this invention. Each class of a moderator agent 303, a plan 305, a plan ID, and a plan iterator 307 has a method while each class of a plan node 311, an activity 313, a moderator template 315 and templates 321 to 326 such as Chain has data and a method.

In the figures, triangles 302, 314, 316 show inheritance of data and method from a higher class while a black circle 312 shows that a plurality of lower classes exist. A plan node is an abstract class and defines both a moderator template and an activity class by a common interface. The plan can thus treat the both classes similarly during generation and execution of the plan.

A mobile agent 301 is a function (place class) currently provided in each place on the distributed computer environment and the user can easily create a mobile agent (moderator agent) by throwing an API indicating creation of a mobile agent to this class. This is a function which is currently supported by the mobile agent of both Java base and Telescript described in the above in the description of prior art.

In the preferred embodiment of this invention, the following methods are provided to replace a concrete activity with a proxy activity and to generate a carrier agent.

TABLE 1

```
setProxyActivity (index, agentid) {
    // exchange activities
    conAct = -plan.elementAt (index);
    address = conAct.getdestination 0;
    proxyAct = new ProxyActivity (address, agentid) ;
    -plan.setPlanNode (proxyAct, index);
    // generate carrier agent
    carrierAgent = context.getAglet (agentid)
    carrierAgent.sendMessage ("store", conAct, index);
}
```

A plan node class has a list of both successors and predecessors and controls the relationship among a plurality of plan nodes. The class of plan node provides methods, "setPredecessor", "setSuccessor" and defines the relationship among the nodes. A concrete class of a plan node can discriminate the relationship among the methods.

The moderator template has state information to distinguish between an origin (place before movement) and a destination (place after movement) to join activities executed in different places. In the preferred embodiment of this invention, the moderator template can join only the activity objects. The moderator template is provided with a plurality of templates including Chain and allows provision of a basic mechanism for having a plurality of split moderator agents work on individual job allotted.

An activity holds address information of a place where a job is to be executed. The activity can execute a job internally held by disclosing "abstract Activity" in response to an instruction from the exterior such as "executeActivity". The proxy activity has information of a carrier agent ID which specifies a carrier agent holding a corresponding concrete activity and instructs the concrete activity to execute the job.

TABLE 2

```
executeActivity {
    index = -plan.indexof (this)
    agent = context.getAglet (id)
    table = agent. sendMessage ("gettable")
    conAct = table.elementAt (index)
    object result = conAct.executeActivity 0 ;
}
```

D-2. Object Configuration of GUI Plan Definition Data

Figure 9:
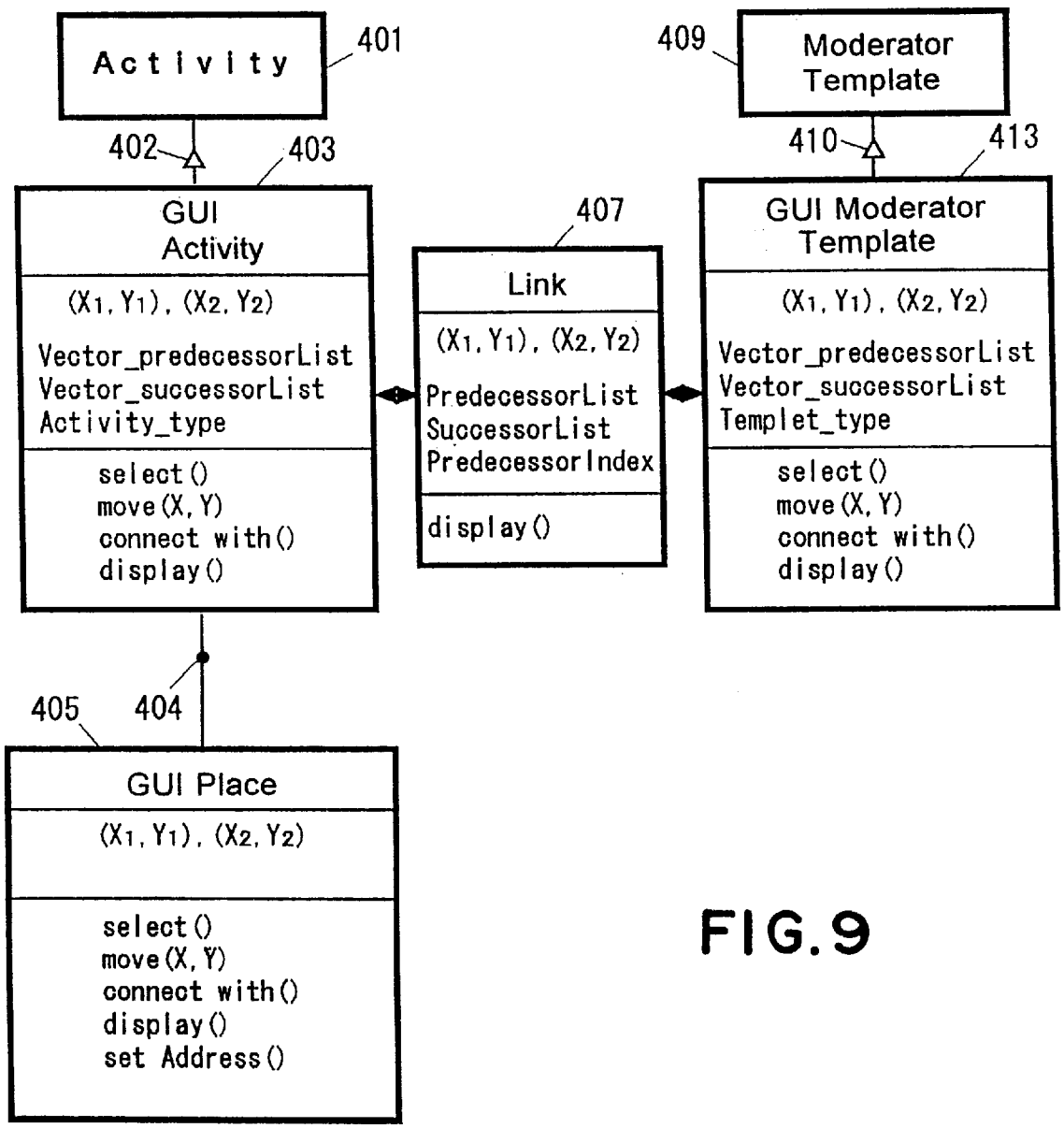
FIG. 9 is an object chart of the plan definition data generated in the preferred embodiment of this invention.
Figure 11:
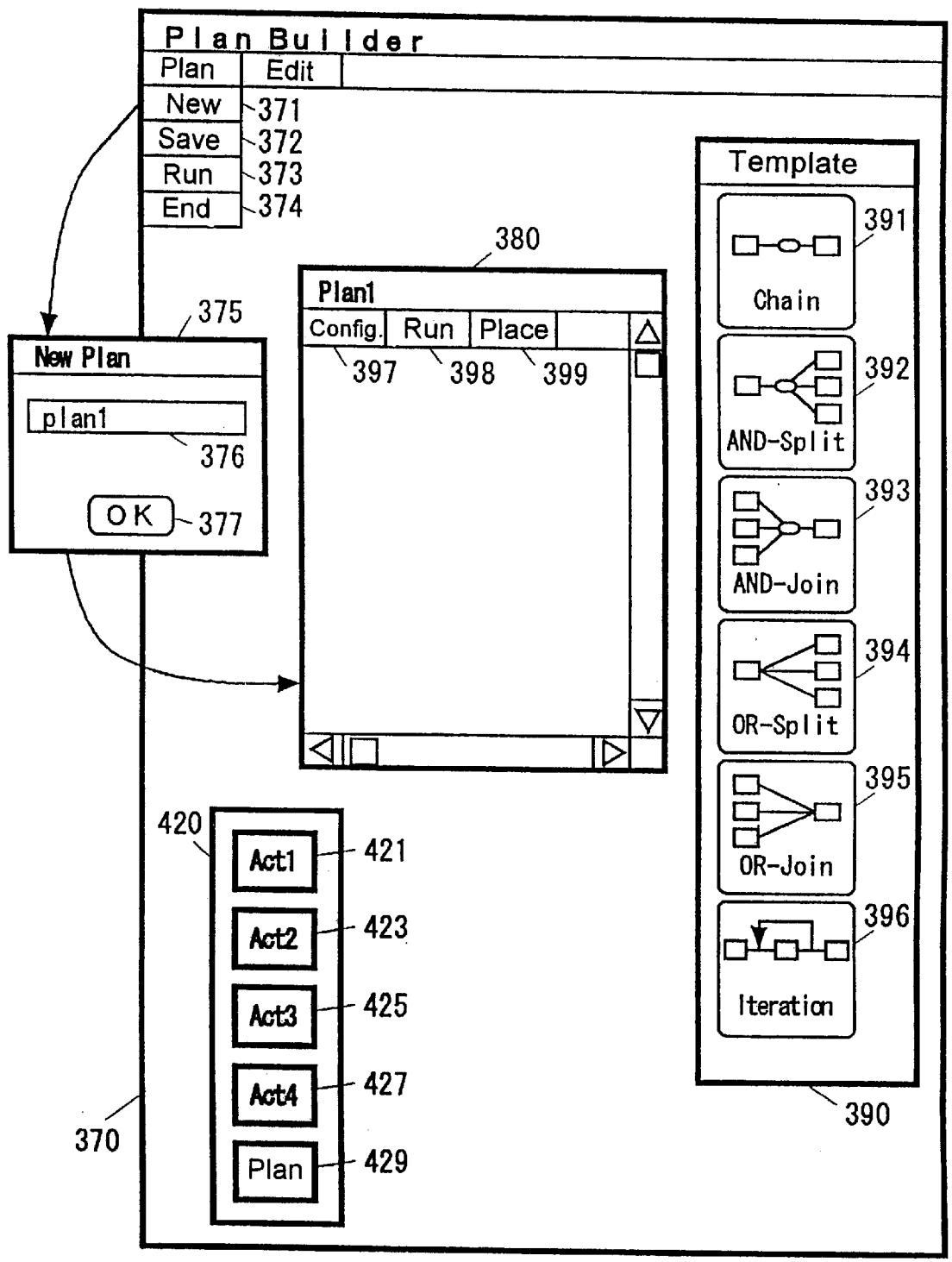
FIG. 11 is a diagram showing the user interface of the mobile agent generating system in the preferred embodiment of this invention.

FIG. 9 is an object diagram of the GUI plan definition data 239 in the preferred embodiment of this invention. Each class of a GUI activity 403, a GUI moderator template 413, a GUI place 405 and a link 407 has data and a method. In this figure, triangles 302, 314, 316 show inheritance of data and method from a higher class while a black circle 312 shows that a plurality of lower classes exist.

The GUI activity 403 is an object to be displayed as an activity on the GUI builder and has data of a successor list and a predecessor list specifying an object which links coordinate values (display start position: X1,Y1 and display ending position: X2,Y2) when displayed on the display. Similarly, the GUI moderator template 409 is an object to be displayed as a moderator template on the GUI builder and has data of a successor list and a predecessor list specifying an object which links coordinate values (display start position: X1,Y1 and display ending position: X2,Y2) when displayed on the display. It also has data of a template type for specifying the kinds of moderator template.

The link object 407 is an object for displaying a linking relationship between the GUI activity 403 and the GUI moderator template 409 and has data of a successor list and a predecessor list specifying an object which links coordinate values (display start position: X1,Y1 and display ending position: X2,Y2) when displayed on the display.

The GUI place 405 is an object for displaying a place where each activity is executed and has data of coordinate value information (display start position of each GUI activity: X1,Y1 and display ending position: X2,Y2) of a GUI activity to be displayed inclusively and address information of the place.

D-3. Message Flow of Mobile Agents

Figure 10:
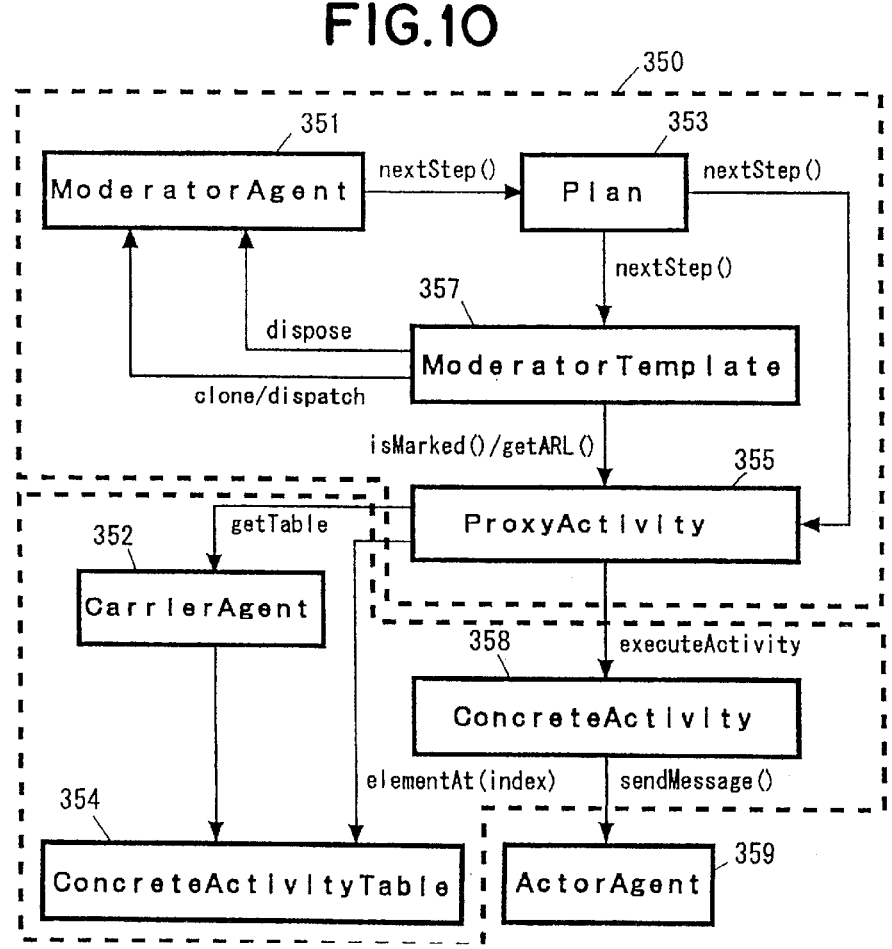
FIG. 10 is a diagram showing the flow of a message between objects in the preferred embodiment of this invention.

FIG. 10 is a diagram showing a major message flow of the classes in the preferred embodiment of this invention. The moderator agent 351 sends nextstep (an instruction indicating to execute the next step) to the plan 353 which in turn, in response thereto, sends out nextstep to the plan node object (moderator template 357 or proxy activity 355). The moderator template 357 sends getARL (an instruction to send an address) and isMarked (marking) to the proxy activity 355 depending on the kinds or state. The moderator template 357 also sends out "clone" (request to prepare a duplication), "dispatch" (request to move and "dispose" (request to extinguish) to the moderator agent 351.

The proxy activity 355 sends out gettable to the carrier agent 352 to obtain a concrete activity table 354 and obtains a corresponding concrete activity 358 from the concrete activity table 354 using an index it holds (index of the order list) as a key. The proxy activity 355 then sends out executeActivity (request to execute an activity) to the concrete activity 358 to have the concrete activity 358 execute the request specified by a user. In response to the above, the concrete activity 358 sends out sendmessage (request to send a message) to the actor agent 359 to execute the request specified by the user.

E. Preparation of Plan Definition Data

This invention provides a development supporting tool which allows a user to simply generate the mobile agent. FIG. 11 to FIG. 16 show a user interface of the development supporting tool in the preferred embodiment of this invention. The user can simply generate coding of the above plan definition part by using the development supporting tool.

At first, when the user selects New 371 from the pull down menu and clicks with a pointing device, the plan object operating part 233 displays a dialog box 375 for input of a plan name. The user can thus care for the plan with a name which is different from the plan ID and familiar to the user. The user next inputs the plan name to an input entry 376 of the plan name and depresses an OK button to open a window 380 for defining a plan. The dialog box 375 for inputting the plan name may be displayed when the "Save" 372 of the pull down menu or the "End" 374 is selected.

Figure 12:
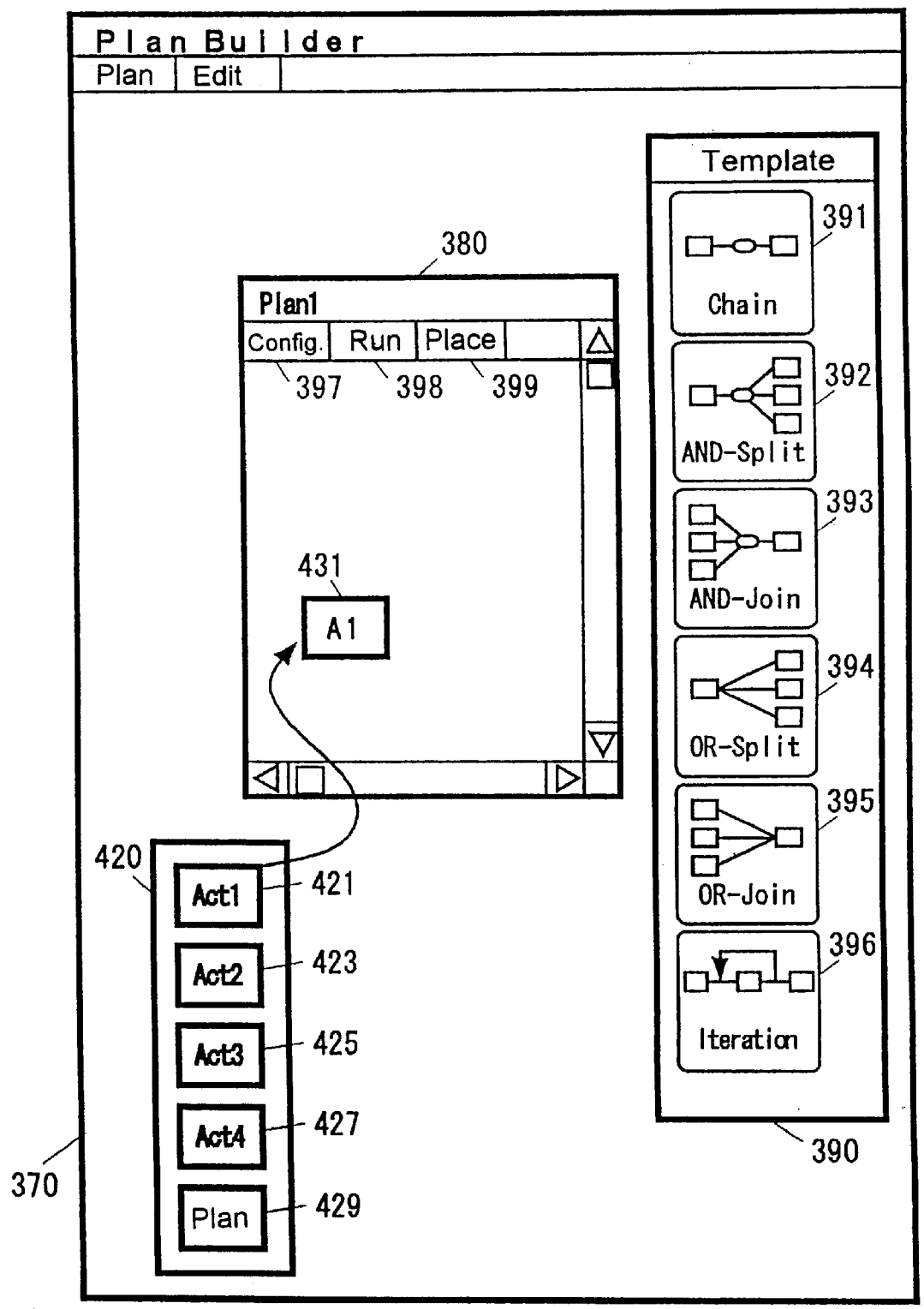
FIG. 12 is a diagram showing the user interface of the mobile agent generating system in the preferred embodiment of this invention.

The user then drags an activity icon (ACTI) of the activity box 420 and drops it in the window 380 for defining a plan using a pointing device. Objects of a GUI activity 403 and a GUI place 405 are then generated based on prototype data of the GUI plan node library 201. The Display method of the generated GUI activity 403 is called upon and displayed in the plan defining window 380 as a GUI activity as shown in FIG. 12. A "0" is set in the predecessor list and the successor list of the GUI activity 403 indicating "no object to be linked".

Figure 13:
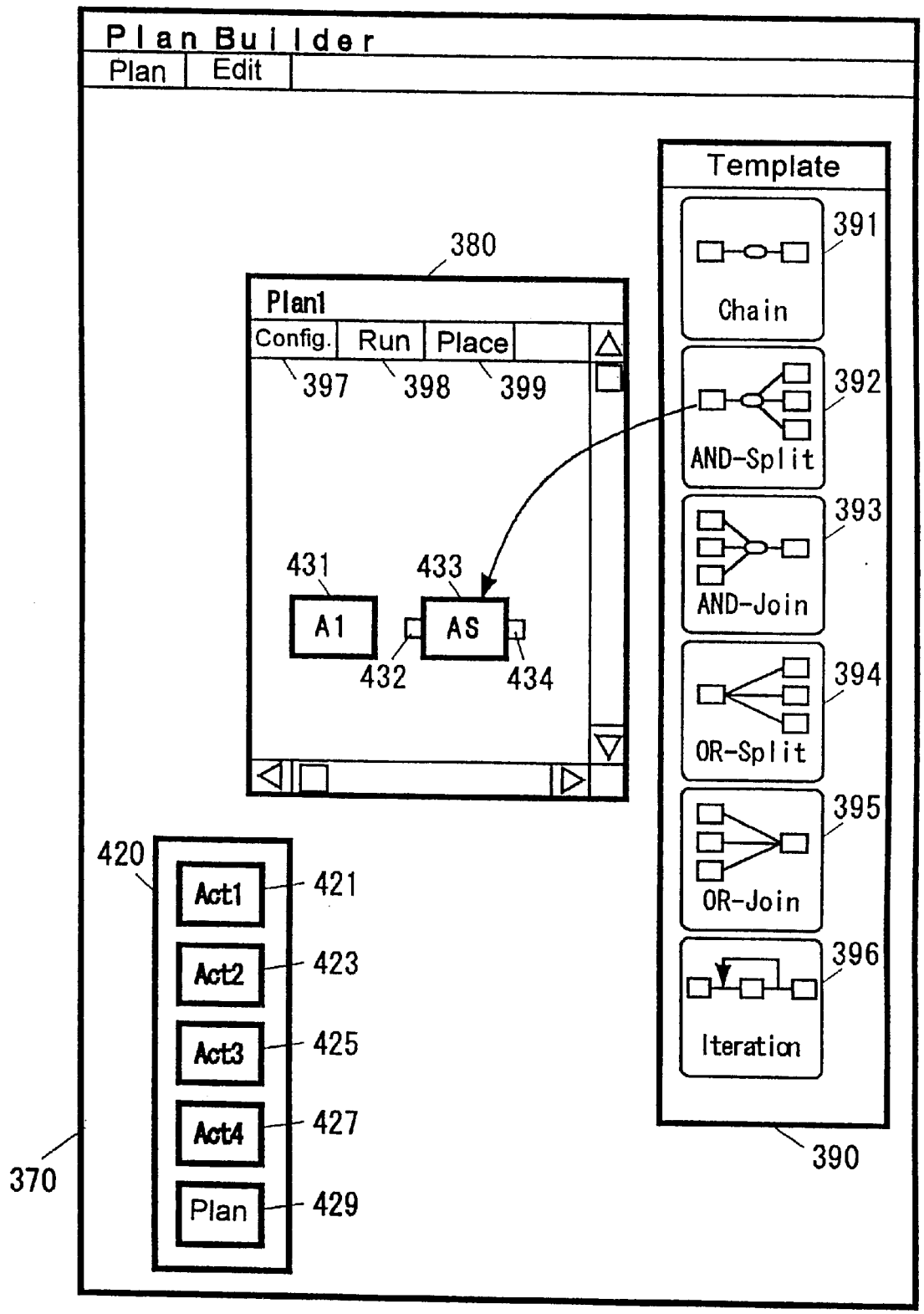
FIG. 13 is a diagram showing the user interface of the mobile agent generating system in the preferred embodiment of this invention.

The GUI activity 431 has a Select method and a Move method as shown in FIG. 9 and is capable of executing processing corresponding to Select clicked by a mouse pointer and modifying the display position by dragging a mouse. The user then drags ANDSplit icon 392 of the template box 390 and drops it in the plan defining window 380 with a pointing device. Objects of the GUI moderator template 410 and the link 407 (2 link objects are generated) shown in FIG. 9 are then generated based on the prototype of the GUI plan node library 201. The Display method of the generated GUI moderator template 413 and the Display method of the link object 407 are called upon and displayed in the plan defining window 380 as a GUI moderator template 433 and a link object 432, 434 as shown in FIG. 13.

At this time, information of the GUI moderator template 433 is set in the successor list of the link object 432 while information of the GUI moderator template 433 is set in the predecessor list of the link object 434. On the other hand, information specifying the link objects 432, 434 are set in the predecessor list and the successor list of the moderator template 433, respectively. The display positions of the link objects are set to a value calculated from the position information of the GUI moderator template 433.

The GUI moderator template 433 also has a Select method and a Move method as shown in FIG. 9 and is capable of executing processing corresponding to Select clicked by a mouse pointer and modifying the display position by dragging a mouse. When the GUI moderator template 433 is moved, the display positions of objects specified by the predecessor list and the successor list of the GUI moderator template 433 and a series of objects linking those objects are updated depending on the amount of movement to re-draw the screen by the Display method.

Figure 14:
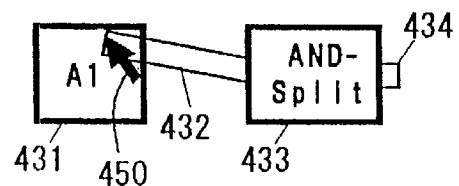
FIG. 14 is a diagram showing the user interface of the mobile agent generating system in the preferred embodiment of this invention.

Thereafter, when the user drags and drops the link object 432 on the GUI activity 431 as shown in FIG. 14, the plan object operating part 233 specifies a linked GUI activity by comparing the display position of the GUI activity with the position of the mouse pointer now dragging, sets information specifying the link object 432 in the successor list of the GUI activity 431, and sets information specifying the GUI activity 431 in the predecessor list of the link object 432. The plan object operating part 233 also updates the display position of the link object 432 to a value corresponding to the display position of the GUI activity 431 to re-draw the screen by the Display method.

Figure 15:
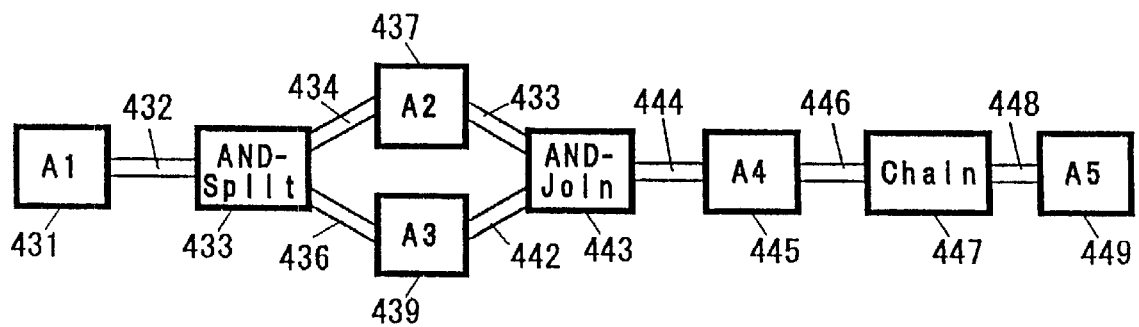
FIG. 15 is a diagram showing the user interface of the mobile agent generating system in the preferred embodiment of this invention.
Figure 16:
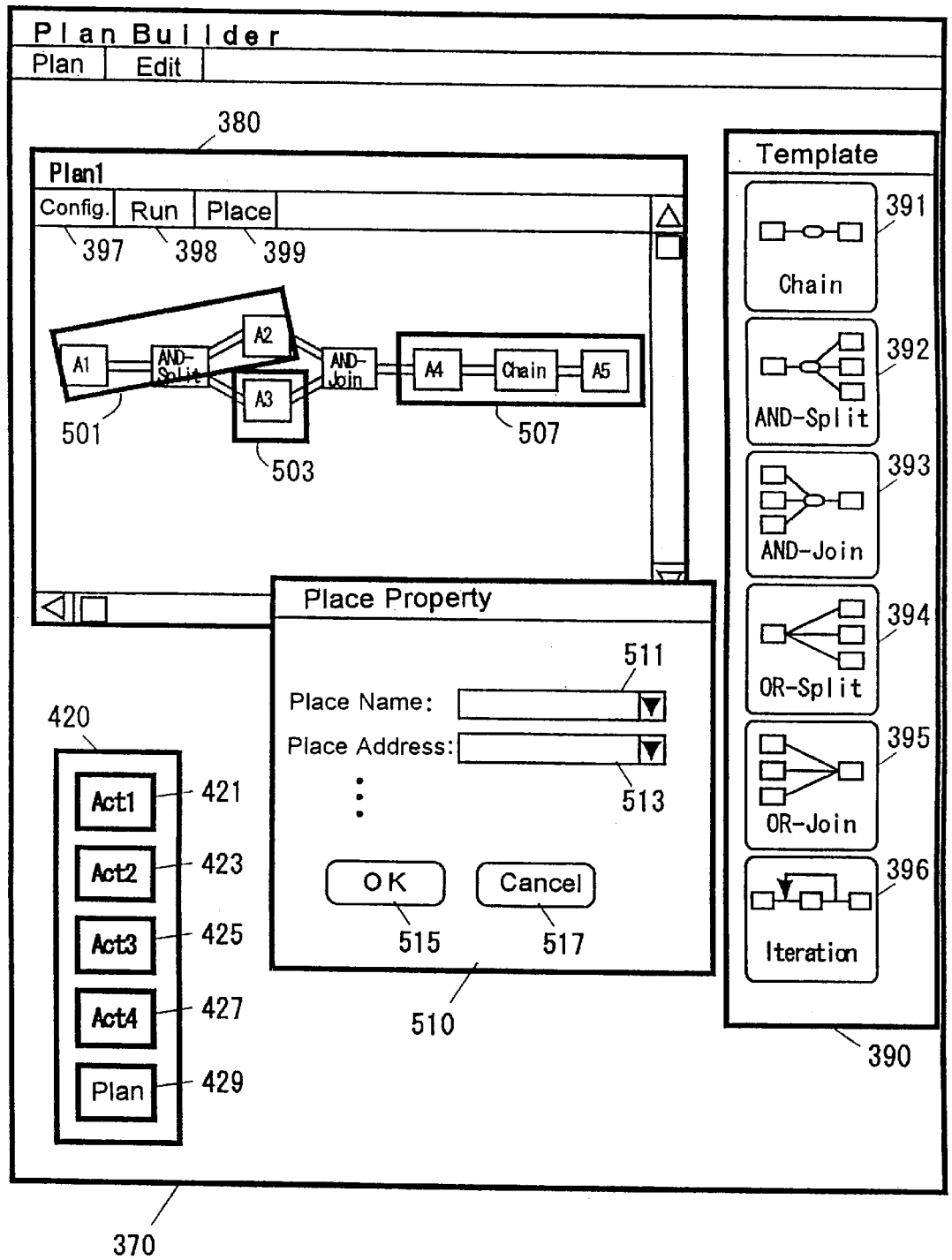
FIG. 16 is a diagram showing the user interface of the mobile agent generating system in the preferred embodiment of this invention.

In this manner, the user can dispose an activity of a desired execution order as shown in FIG. 15 in accordance with the nature and the procedure of a job done by a mobile agent. Thereafter, when the user selects a desired activity which the user desires to execute in the same place while keeping the control key depressed and clicks the icon 399 of the place, rectangles 501 to 503 including the selected activity are displayed and a place property setting window 510 is displayed.

In the preferred embodiment of this invention, the rectangles 501 to 503 are obtained by ordering the center coordinates of the selected activities along x-coordinate direction and calculating rectangles of a given width having their centers lie on a line segment connecting the center coordinates of neighboring activities. Incidentally, ellipses having their focus lie on the center coordinate of the activities may be substituted for these rectangles.

When more than two activities are specified to be in a same place in the preferred embodiment of this invention, the overlapping portions of the rectangles are removed and displayed as a single polygon. Also, rectangles or polygons symbolizing the GUI places are allocated with different color attributes so that the operator can distinguish between different places.

While an activity which is desired to be executed in a same place is selected by clicking the icon 399 of the place while depressing the control key of the keyboard, this can be also done by surrounding the activity which is desired to be executed in a same place by pointing and dragging a mouse or cancel the selection by clicking after the selection. When the user sets a place name or a place address, they are set as an address and a place name of the GUI place 405 of the selected GUI activity 403 (FIG. 9).

F. Generation of Plan

Figure 17:
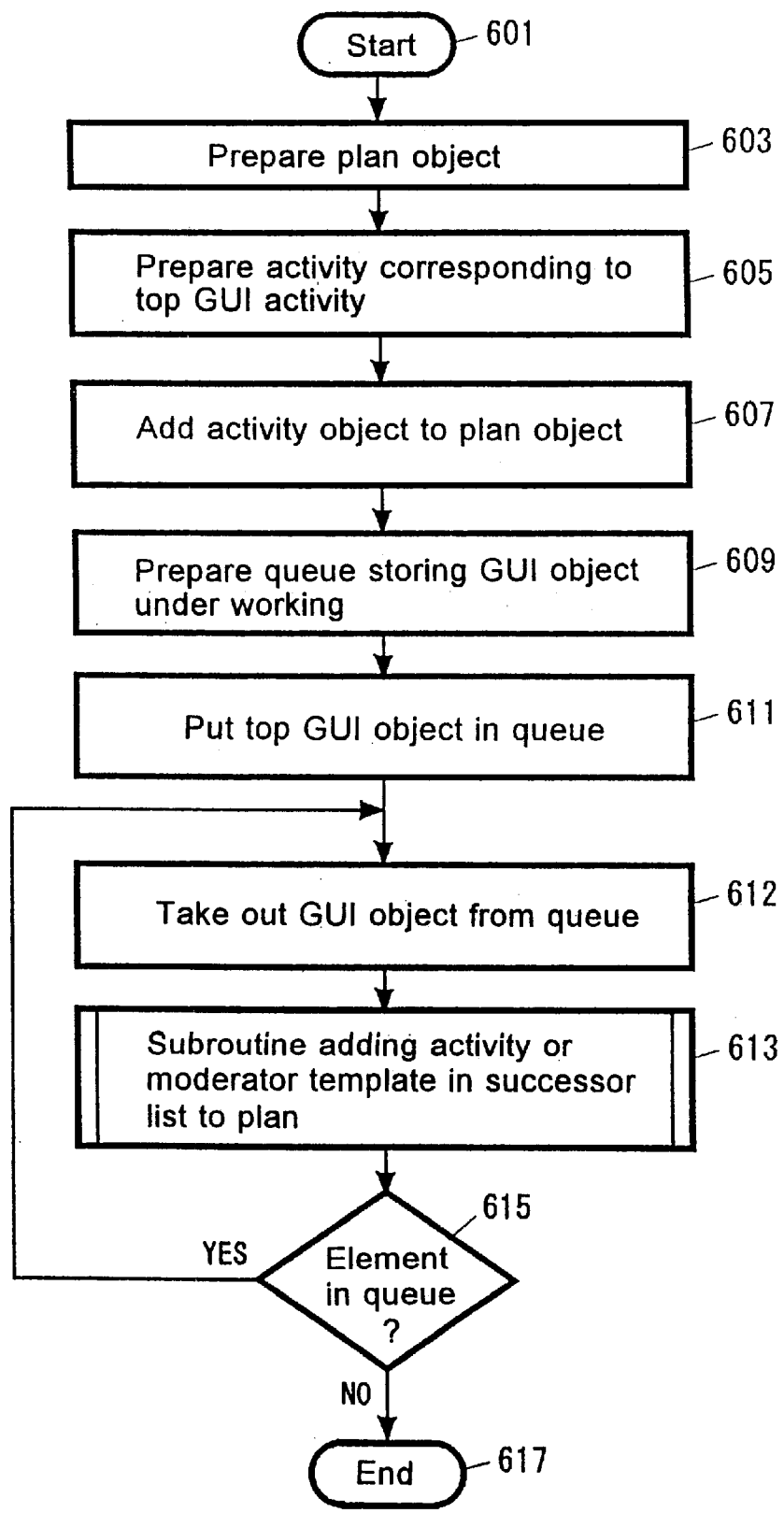
FIG. 17 is a flow chart showing a procedure of generating a run code (plan) based on plan definition data in the preferred embodiment of this invention.

FIG. 17 is a flow chart showing a procedure of generating an run code (plan) based on the plan definition data. First of all, a plan object is generated (block 603). Generation of a plan generally consists of a step of generating a plan ID and a step of establishing a link with an object which is in a position lower than the plan object.

In the preferred embodiment of this invention, the plan object is allocated with a plan ID which is unique on the global network. In the preferred embodiment of this invention, the plan ID generating part 215 (FIG. 4) generates a plan ID by composing a URL of the internet, a port number, an agent ID (allocated to the mobile agent generating part), and a serial number (allocated each time the mobile agent generating part generates a plan ID).

An example of the coding of the plan ID generating part is shown in the Table 3. In the preferred embodiment of this invention, instructions of the plan ID generating part are provided to the user as a program part.

TABLE 3

```
public class Planner extends StationaryAgent{
    private Plan _plan;
    private PlannerFrame f;
    private URL _home;
    private AgletIdentifier _id;
    private int _planIndex = 0;
    public void onCreation(Object args){
        //generate a window for selecting a plan.
        f = new PlannerFrame("JMT -PlannerAgent", this);
        f.show();
        try}
        //acquire URL in which the mobile agent generating part
    exists
            _home = getAgletContext 0.getHostingURL 0 ;
        //acquire ID of the mobile agent generating part
            _id = getIdentifier();
        }catch(InvalidAgletException e){
            Utility.print(this, e.getMessage());
        }
    }
}
```

In the preferred embodiment of this invention, "New operator" for generating a plan object is provided as a function of Java and a new plan object is generated by executing this class using the plan ID as an argument. The moderator agent is generated by utilizing functions (place class) currently provided in the places as described in the above. In the preferred embodiment of this invention, the moderator agent is generated by throwing an API indicating generation of a mobile agent to the Aglets class of a mobile agent of Java base.

Next, an activity corresponding to the top GUI activity is generated (block 605). Specifically, a run time class name (Al in this case) is acquired from the activity type of the GUI activity and then its instance is generated using the class name "A1" as a key. The generated activity is added to the plan object (block 607).

A FIFO (First In First Out) queue is generated for storing a GUI object under processing (GUI activity, GUI moderator template or link object) (block 609) and the top GUI object (GUI activity) is put in the queue (block 611). The top GUI object is determined by seeing whether or not the predecessor list is null, etc.

Figure 18:
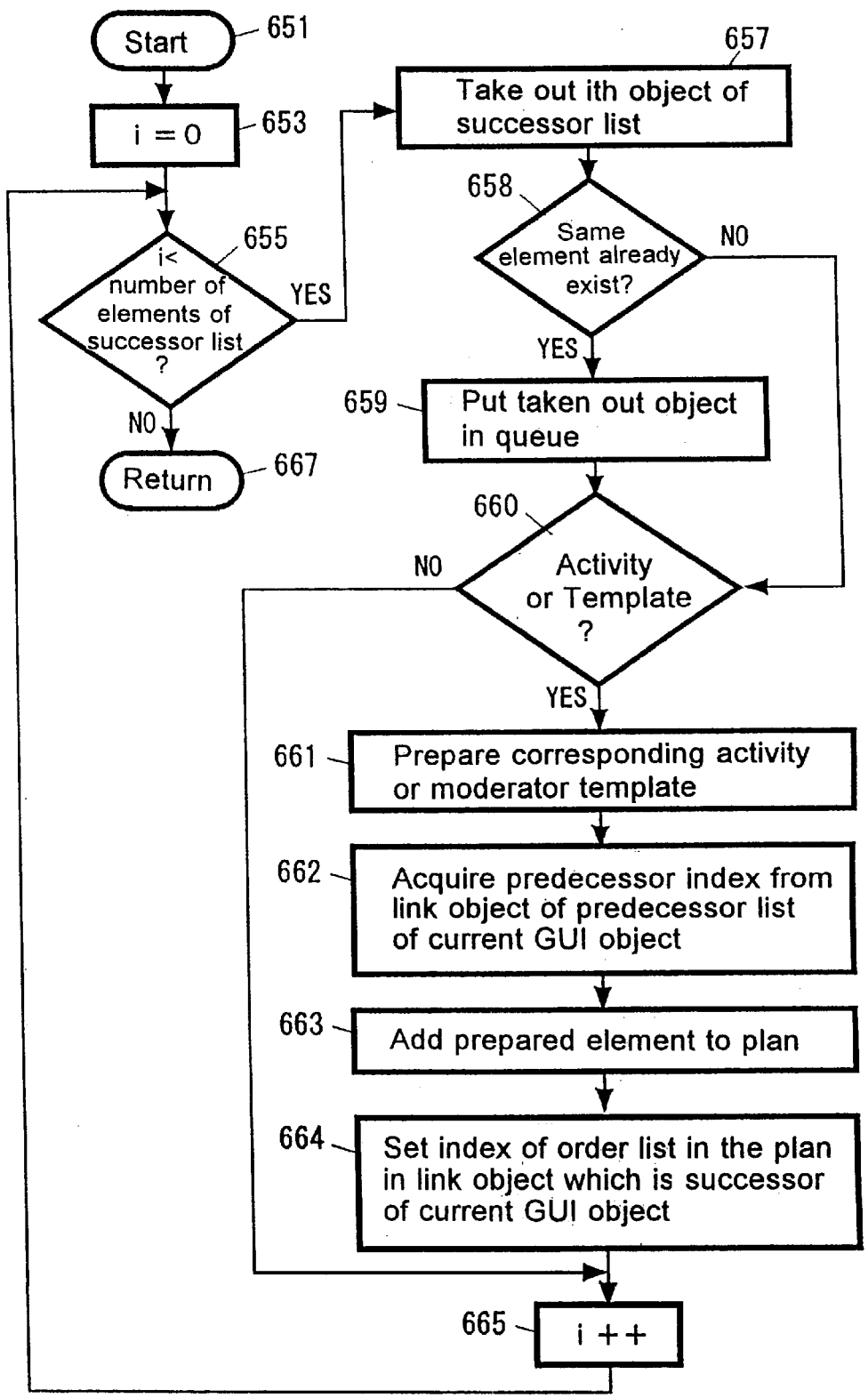
FIG. 18 is a flow chart showing a procedure of generating a run code (plan) based on plan definition data in the preferred embodiment of this invention.

An element (GUI object) is then taken out from the generated queue (block 612) to execute a subroutine (block 613) which adds an activity or a moderator template existing in the successor list shown in FIG. 18. FIG. 18 is a flow chart showing the processing procedure of this subroutine. First of all, the number of elements of the successor list is compared with the value i to determine whether or not this process is executed for all elements of the successor list (block 665). When the number of elements of the successor list>i, the i-th GUI object of the successor list is taken out. (block 657). It is then determined whether or not the taken out GUI object already exists in the queue (block 658) and only the element which does not exist is put in the queue which was generated in block 609 of FIG. 17 (block 609).

Next, it is determined whether or not the taken out element (GUI object) is a GUI activity or a GUI moderator template (block 660). If the taken out element is a GUI activity or a GUI moderator template, a corresponding activity or moderator template is generated (block 661). At this time, address information of the corresponding GUI place is acquired if it is a GUI activity.

A predecessor index is then acquired from the link object of the predecessor list of the current GUI object to set its own predecessor list. In a GUI activity or a GUI moderator template other than the top, the predecessor list never fail to contain information of a link object. Because null information is set in the predecessor list of the top GUI activity, a null is set also in its own predecessor list.

The generated element (activity or moderator template) is then added to the plan and the index of the order list in the plan is set in the link object which is the successor of the current GUI object. The link object holds this value as a predecessor index which is used as information for forming a predecessor list of the activity or the moderator template. If the taken out element is not a GUI activity or a GUI moderator template, corresponding activity or moderator template is not generated and the next element is processed.

After the process of the block 657 to 665 is repeated the number of times equal to the number of the elements of the successor list, the flow returns back to FIG. 17 to determine whether or not an element exists in the queue and, if there exists an element, it is taken out (block 612) and a subroutine (block 613) to add an activity or a moderator template existing in the successor list shown in FIG. 18 is executed again.

Figure 19:
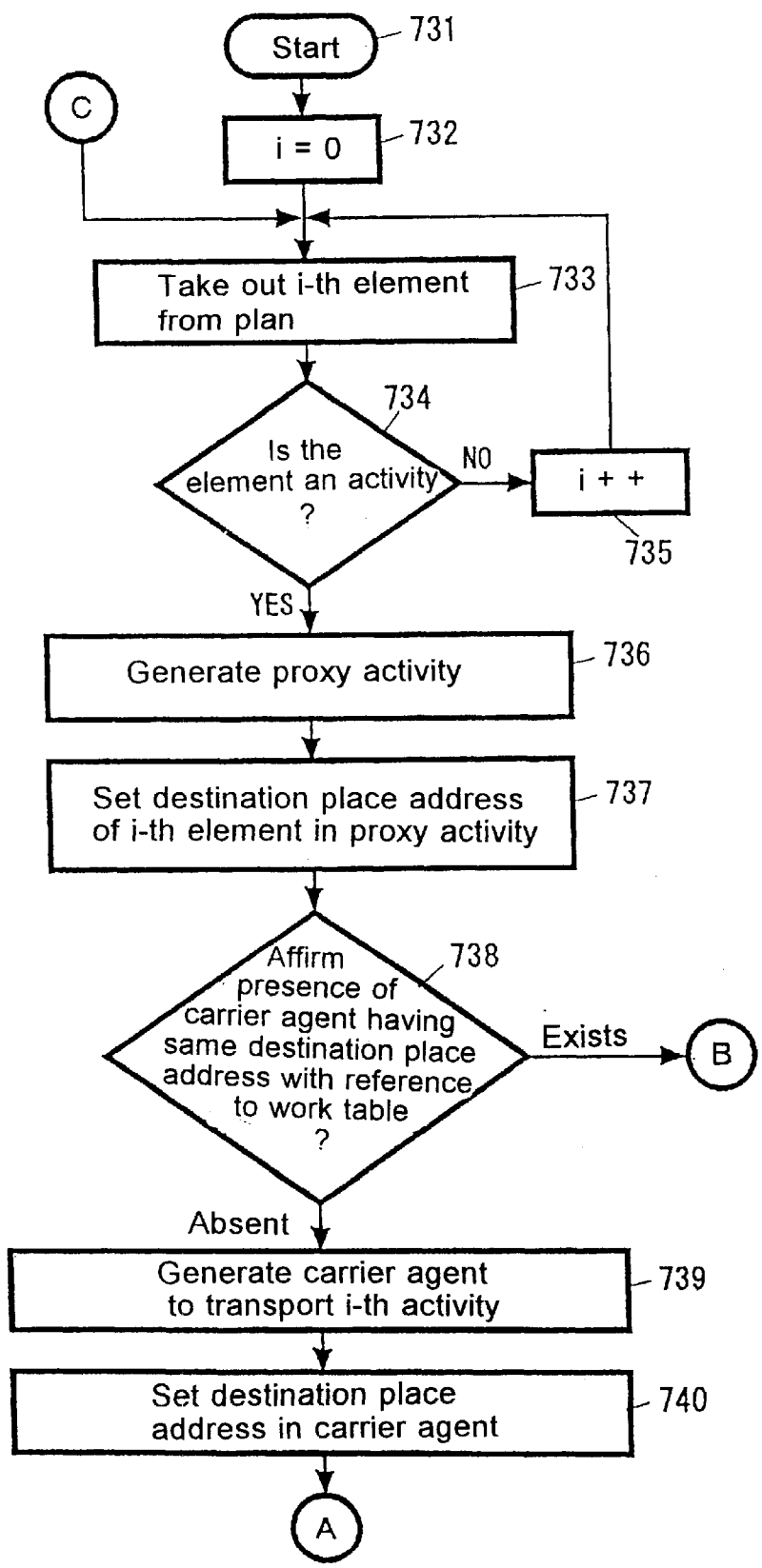
FIG. 19 is a flow chart showing a procedure of generating a carrier agent and transmission to places in the preferred embodiment of this invention.
Figure 20:
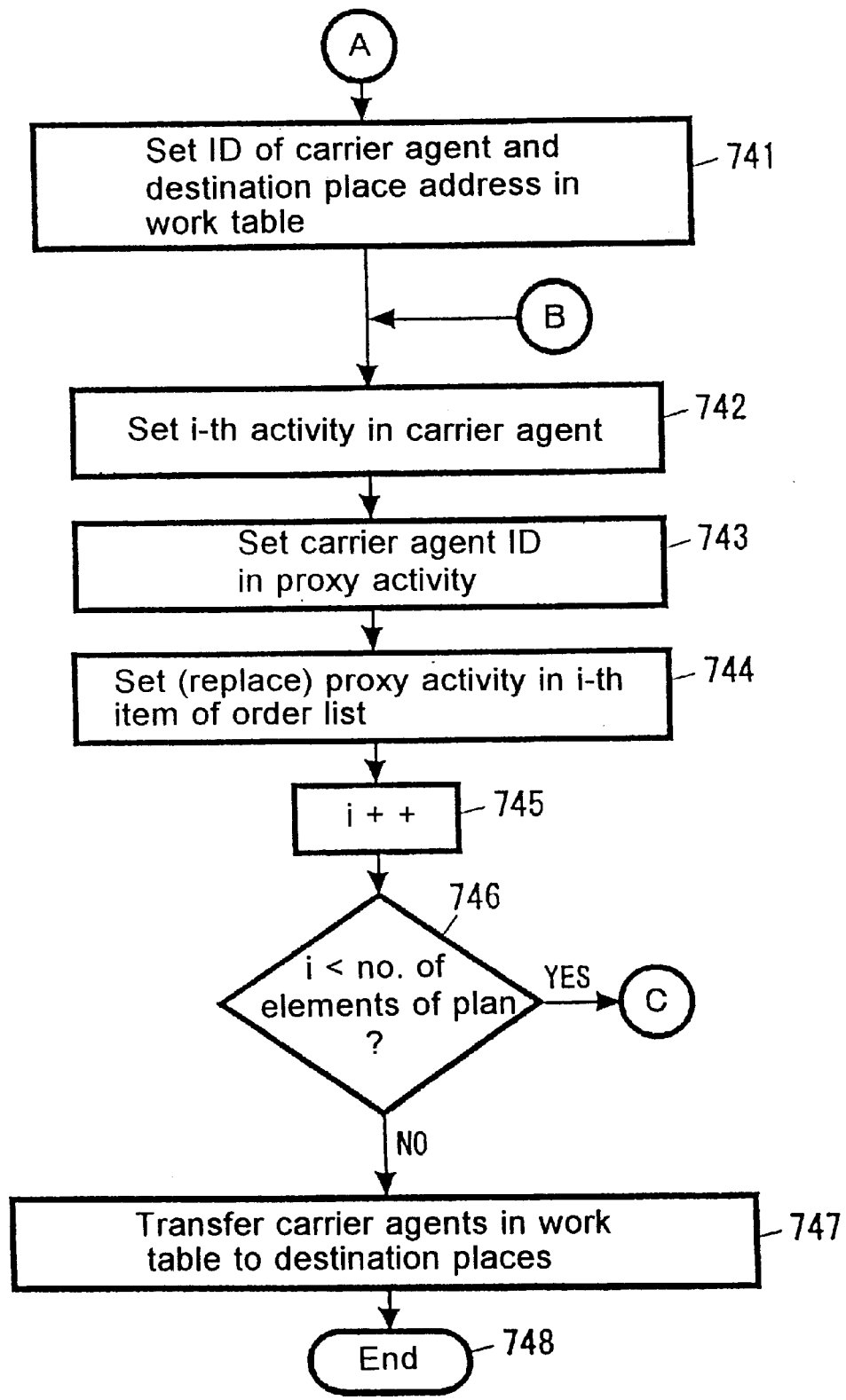
FIG. 20 is a flow chart showing a procedure of generating a carrier agent and transmission to places in the preferred embodiment of this invention.

G. Generation of Carrier Agent, Replacement with Proxy Agent, and Transmission of Carrier Agent to Each Place When a plan has been generated, the plan split part 224 as shown in FIG. 4 is started to generate a carrier agent 230 for each destination place and replace a concrete activity 205 correlated to the order list with a proxy activity 222. Also, the generated carrier agent is transferred to each destination place. FIG. 19 and FIG. 20 are flow charts showing processing procedures performed by the plan split part 224 and the carrier agent 230 to generate a carrier agent, replace with a proxy agent and transmission of a carrier agent to each place.

When the process is started (block 731), "i" is initialized at first (block 732) and an i-th element is taken out from the plan (block 733). It is the determined whether or not the taken out element is an activity (concrete activity) (block 734). If the taken out element is not an activity, the next element is taken out (block 735, 733). While all concrete activities are replaced with proxy activities and concrete activities are carried on a carrier agent for transfer to each place in the preferred embodiment of this invention, only a part of concrete activities may be replace with a proxy activity by modifying the block 734 to a determination of whether or not the element is a specific concrete activity.

If the taken out element is an activity, a proxy activity is generated (block 736) and an address of a destination place taken out from the concrete activity is set (block 737). Then a word table is referred to determine whether or not a carrier agent having a same destination place address exists.

When a carrier agent having a same destination place address does not exist, a carrier agent for carrying the concrete activity is generated (block 739) and an agent ID and the destination place address are set in the generated carrier agent (block 740). Incidentally, the carrier agent ID is generated according to the plan ID and a serial number corresponding to the place. The ID of the carrier agent and the destination place address are then set in the work table. Also, the i-th concrete activity is set in the i-th position of a concrete activity table of the carrier agent (block 742). A "time bomb" may be set and extinguished at a predetermined time in the carrier agent.

When a carrier agent which used to hold a same effective concrete activity in the past and was sent to a same place exists (this can be determined by holding the work table for a given time duration), the agent ID may be replaced with index information so as to instruct to specify and execute a same concrete activity of a carrier agent which was sent out to a proxy agent in the past without generating a carrier agent.

When a carrier agent having a same destination place address exists, the i-th item of the concrete activity table of the carrier agent is set (block 742). On the other hand, an ID of the carrier agent is set in the proxy activity which, in turn, is set (replaced) in the i-th item of the order list. By performing the process of the blocks 733 through the block 744 for elements of the all plans, generation of a carrier agent corresponding to each destination place and replacement of a concrete activity of the substance of the mobile objects with a proxy agent are completed (blocks 745, 746). The generated carrier agents are then. transferred to respective destination places (block 748).

Because the example described in the above is an embodiment which is an improvement to an embodiment in which the substances of the mobile objects are moved while directly holding a concrete activity, a plan holding a concrete activity is once generated and the concrete activity is replaced with a proxy activity. However, a plan directly holding a proxy activity may be generated when the substances of mobile objects are generated. The concept of this invention also includes such embodiment.

H. Execution of Plan

H-1. A case of Topology including Chain Template

Figure 21:
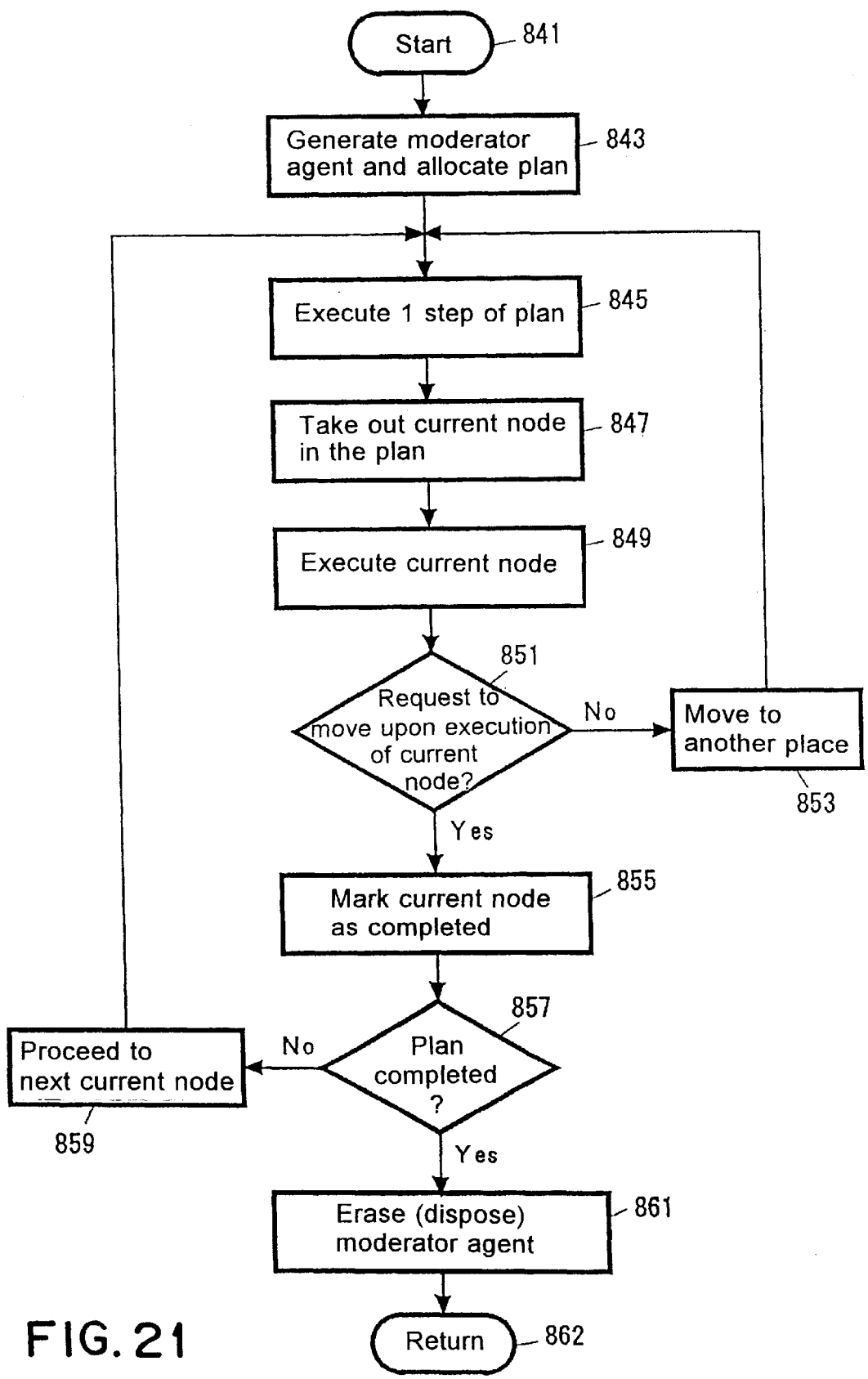
FIG. 21 is a flow chart showing an execution procedure of a plan object in the preferred embodiment of this invention.
Figure 22:
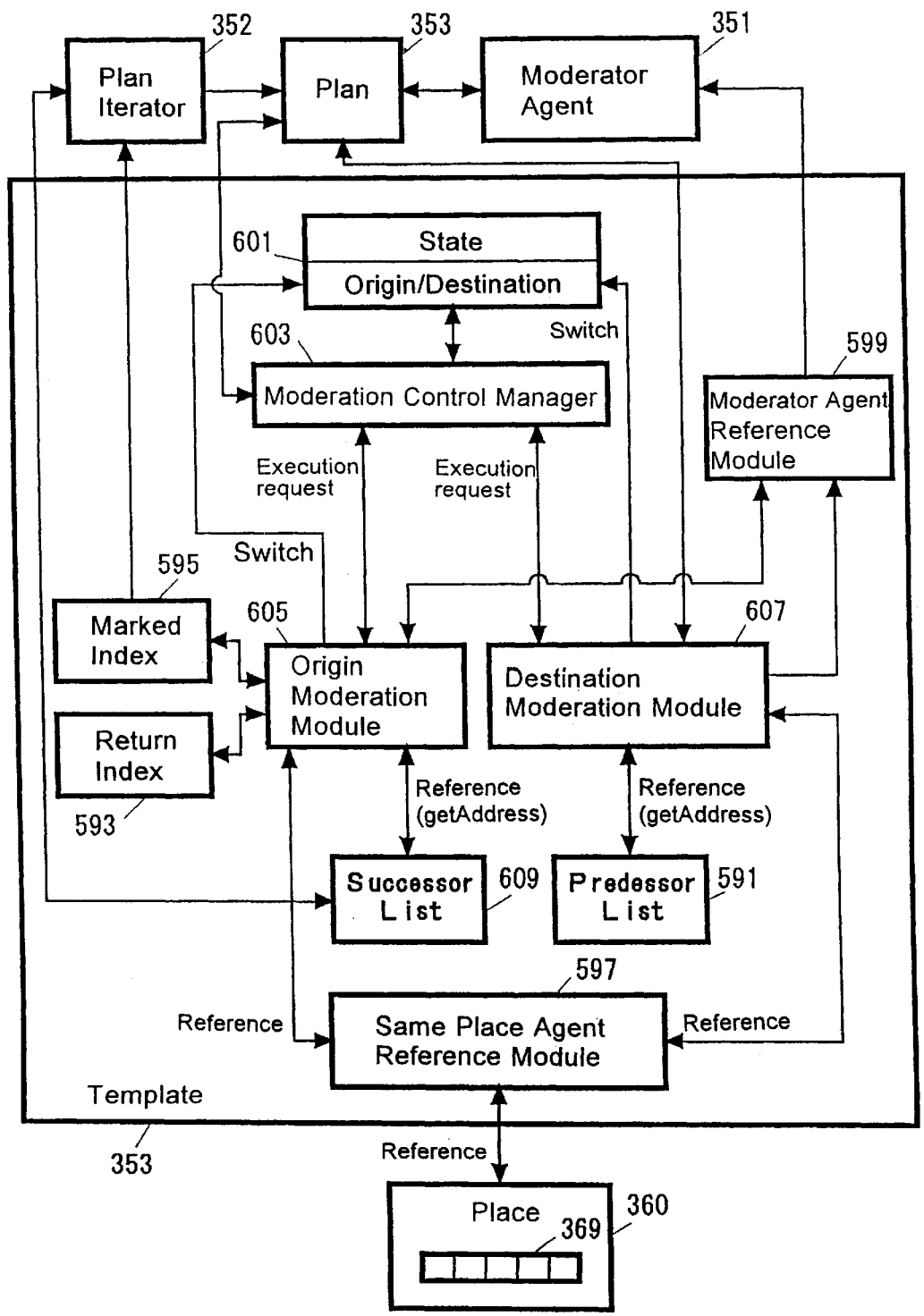
FIG. 22 is a functional block diagram of a moderator template in the preferred embodiment of this invention.

The operation of the mobile objects in a case of a topology including a Chain template is now described with reference to FIG. 21 through FIG. 25. FIG. 21 is a flow chart showing execution procedure of a plan and FIG. 22 is a functional block diagram of a moderator template. FIG. 25 is a schematic diagram of a state in which mobile objects move from a place of origin to a destination place. Reference is made to FIG. 21 first of all. When a moderator agent 31 is generated and a plan 353 is allocated (block 843), the moderator agent automatically executes the plan (block 845).

In response to an instruction "NextStep" which is sent from the moderator agent 351 to the plan object 353, the plan object 353 takes out a current plan node at first (block 847). In the preferred embodiment of this invention, a control is maintained as to in which step of the plan node a plan iterator object 352 is currently and information (current) is provided as to in which step it is currently in response to a query from the plan object 353. When the plan iterator object 352 returns "0" (the first step) in response to the inquiry of the current, the plan object 353 takes out "act1" and then asks the "act1" to have the activity defined therein execute the request which is controlled by the activity (block 849).

Figure 23:
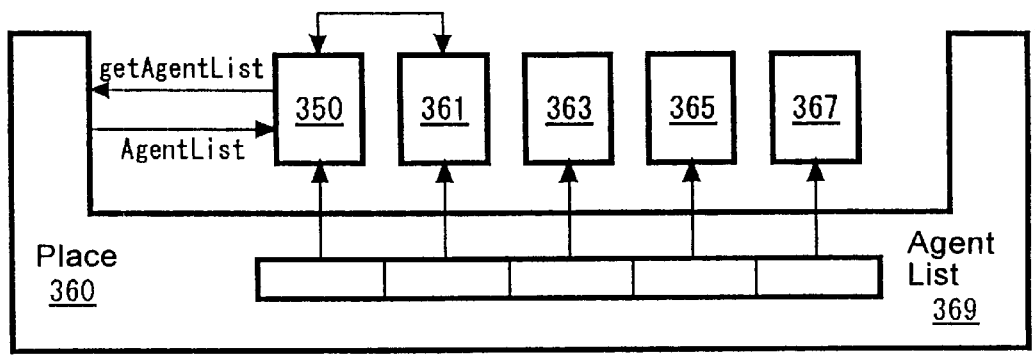
FIG. 23 is a schematic diagram of a place in the preferred embodiment of this invention.

The activity determines whether or not the class name of an agent (agent name) held therein exists in the same place. As shown in FIG. 23, the moderator agent 350, upon arriving at the place 360, tell the place 360 its agent name which is controlled by the place 360 as an agent list 369. The agent existing in the place 360 can find an agent existing in the same place by issuing an instruction "getAgentList" to the place 360 for inquiry because the place has a function to return AgentList. Because act1 has been replaced with a proxy activity, it determines whether or not an agent corresponding to the carrier agent ID held by itself exists and, if the agent does not exist, waits arrival of a carrier agent (enters a sleep mode).

When a corresponding agent exists, the act1 instructs the carrier agent to execute the activity of a corresponding index the number of the order list to which the proxy activity is correlated) of the concrete activity list. The concrete activity searches an actor agent in accordance with the content of an internally held message in response thereto. The concrete activity sends a message (request) held therein to the agent (actor agent) 361 found. The actor agent 361 in turn sends an object of return to the requesting concrete activity 358 in response to the request. The concrete activity 358 further sends the received object execution instruction to the requesting proxy activity as a return. The proxy activity stores the received object in a record 525 of Result.

The proxy activity notifies the plan object 353 that the requested job has been completed and the plan object 353 marks act1 indicating that the process has been completed (block 855). The plan object 353 then asks the plan iterator 352 to move the step forward (block 859) and the plan iterator 352 provides the plan object 353 with information of current. Because the current is "1" (the second step), the plan object takes out the object of Chain template (blocks 845, 847) and asks the Chain to execute (block 849).

The moderation control manager 603 of the Chain inquires the state control part 601 of the current state. Because the state control part 601 is in the state of origin in default, it notifies the moderation control manager 603 that it is the origin. The moderation control manager 603, upon receiving information of the state from the state control part 601, asks the state control part 601 to switch the state. The state control part 601 switches the state from the origin to the destination in response to this.

Figure 24:
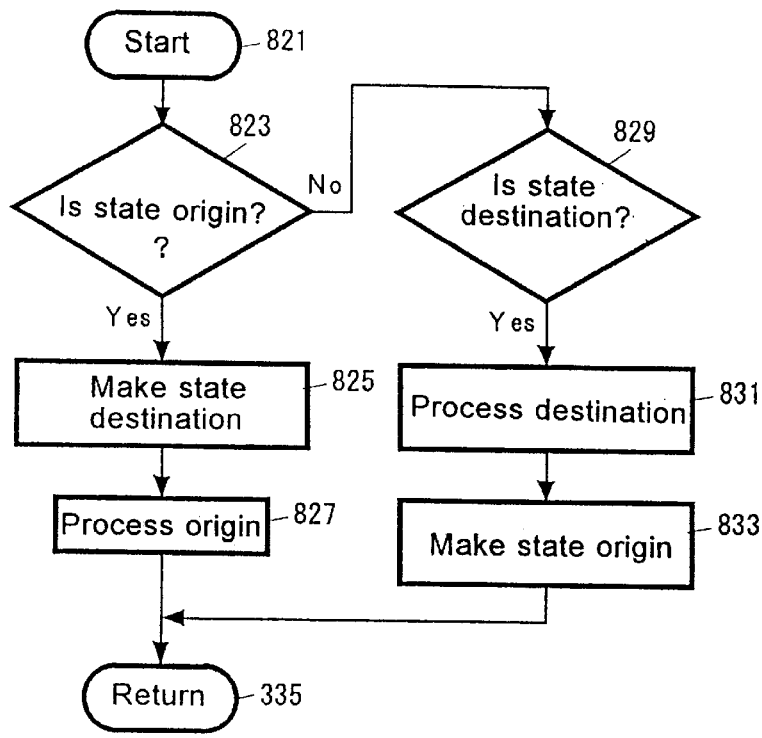
FIG. 24 is a flow chart showing a summary of processing the moderator template in the preferred embodiment of this invention.
Figure 25:
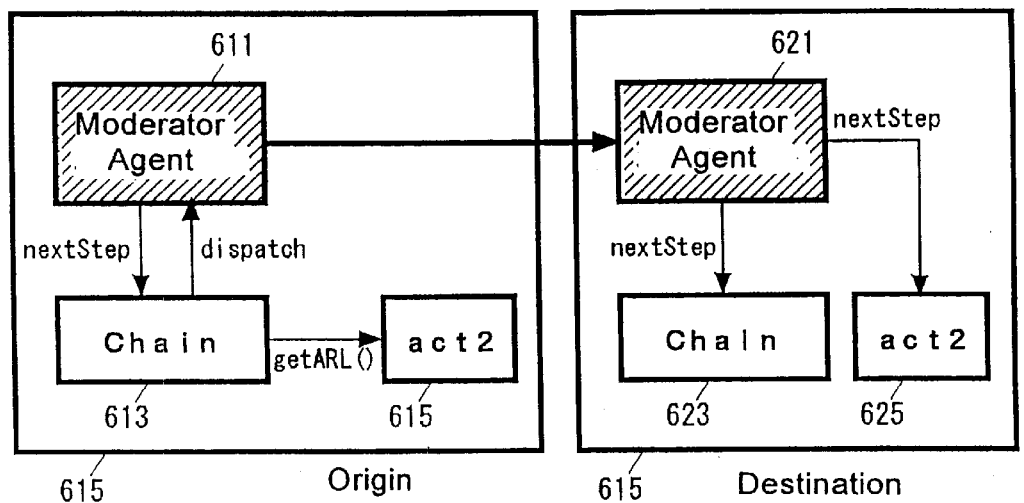
FIG. 25 is a schematic diagram showing the state in which mobile objects in the preferred embodiment of this invention move from an origin place to a destination place.

Switching of the state done by the template and the flow of the process in the origin or the destination are shown in FIG. 24. The flow chart shows an operation which is common to a plurality of templates though the content of processing in the origin in the block 825 and in the destination in the block 831 vary for different kinds of the templates.

The moderation control manager 603 asks the moderation module 605 for the origin to execute. A set of instructions for the template to operate in respective places are controlled in the moderation module for the origin 605 and the moderation module for the destination 607. The moderation module for the origin 605 acquires an address of the place where the moderator agent 351 exists currently by inquiring the moderator agent reference module 599. The moderation module for the origin 605 also asks the successor list 609 to deliver the address of the activity registered therein. The successor list 609 acquires the address from a registered activity (act2) to deliver it to the moderation module for the origin 603.

The moderation module for the origin 603 compares the address of the activity with the address of the place where the current moderator agent exists and moves the moderator agent to the address of the activity if the addresses do not match. Specifically, the moderation module for the origin 605 sends out an instruction commanding movement via the moderator agent reference module. If the addresses match, the process ends.

The plan object again asks the plan object to execute 1 step in the destination. Similarly, it takes out the plan node of the current. The plan object asks Chain to execute the next step. Chain affirms information of the state and performs processing of the destination. The information of the state is restored to the state of the origin. When the plan affirms the completion of processing the destination of Chain, it takes out the plan node of the next current (act2) and asks to execute the activity. The act2 acquires the result which the act1 internally holds.

In the preferred embodiment of this invention, the destination module 607 refers to the predecessor list 591 and sends out an instruction of "getResult" asking the Chain to send the result of the process. The Chain searches the Result which it holds in response thereto. However, because the Chain does not hold the Result, it goes to the object (act1) registered in the predecessor list 591 to take the Result and returns that Result to the act2 with further reference to the predecessor list 591. When there is no object registered in the predecessor list 591, a Dummy is sent to the act2 indicating that the Result is not held. Alternatively, this may be done by preparing a record which stores the Result in the template.

The act2 obtains a reference to a report agent existing in the same place using the class name of the internally held agent as a key. The act2 sends to the report agent a message held internally with the result obtained from the act1 being an argument. The plan takes out the next current node. In this case, because a current node does not exist, the plan detects this and ends processing. The moderation module for the destination 607 sends out an instruction to extinguish the moderator agent to the moderator agent via the moderator agent reference module 599.

H-2. The Case of Topology including an Iteration Template

Figure 26:
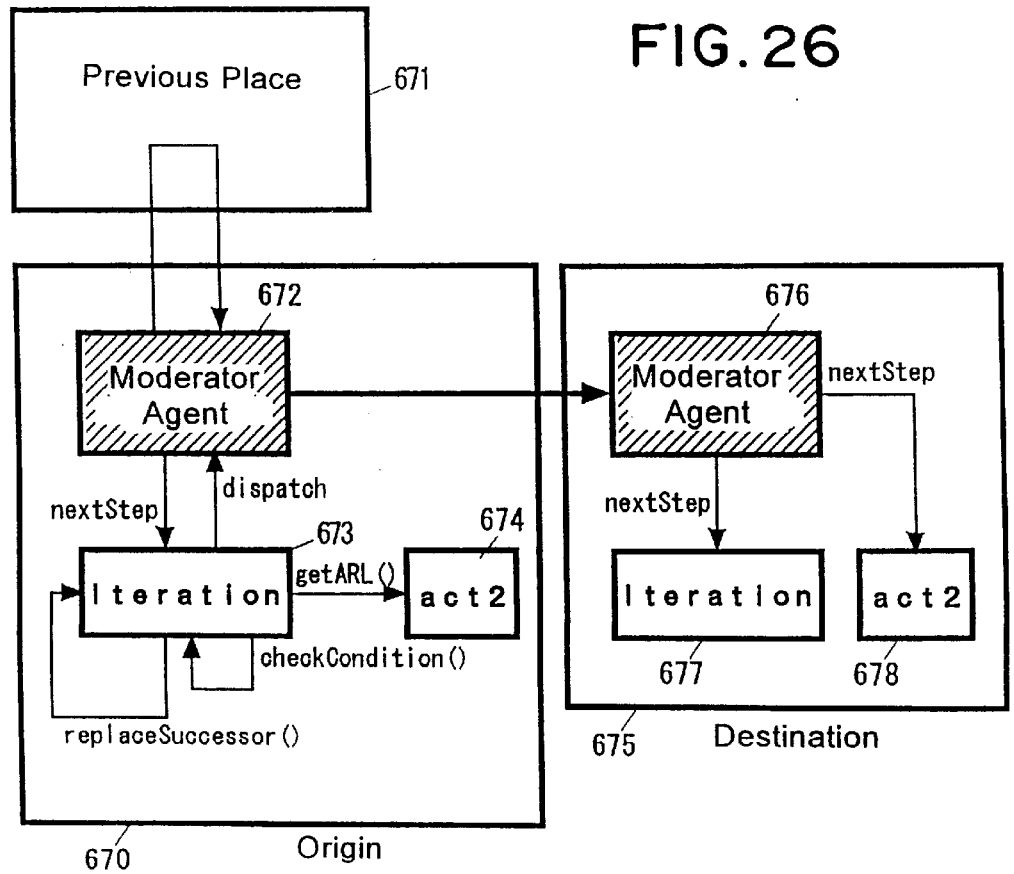
FIG. 26 is a schematic diagram showing the state in which mobile objects in the preferred embodiment of this invention move from an origin place to a destination place.

FIG. 26 is a diagram showing the summary of operation of the mobile objects which are controlled by the Iteration template. Processing in the case of a topology including the Iteration template is now explained with reference to FIG. 22. Similarly to the case of the Chain, a moderator agent 351 is generated, a plan object 353 which is then prepared as an argument is delivered and the plan 353 is executed step by step. The plan object 353 also takes out the plan node (Chain) of the current similarly to the case of the Chain while the Chain executes process in the origin. Also, the plan object 353 executes a process in the destination and the activity of the act1 as described in "H-1. The Case of Topology including Chain Template".

Figure 27:
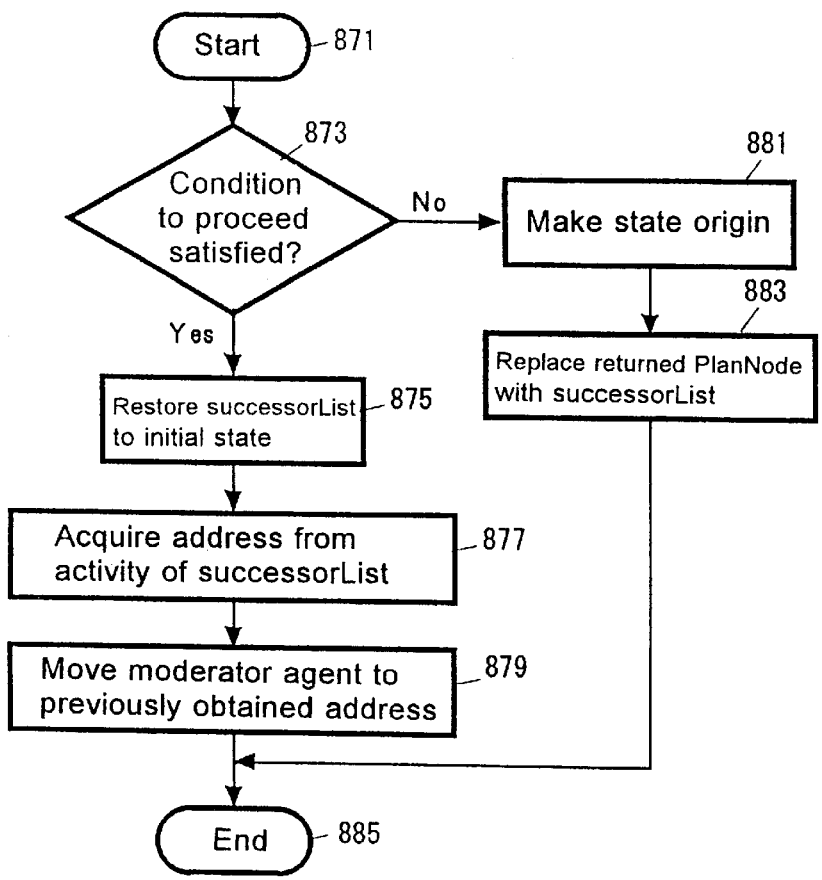
FIG. 27 is a flow chart showing a procedure of processing the Iteration template in the origin in the preferred embodiment of this invention.

When the act1 has been processed, the plan 353 then asks the Iteration to execute the next step. FIG. 27 is a flow chart showing the procedure of a process in the origin of the Iteration template. In the process in the origin of the Iteration template, it is determined whether or not the next step may be processed, e.g., whether or not the information of the result of the act1 matches a predetermined condition (block 873).

If the condition is met, a successor information internally held is stored in the successor list (block 875). An address is taken out from the act2 of the successor list (block 877) and the moderator agent is moved to that address (block 879). When the condition is not met, the state is set to origin (block 881), a reference of the plan node is obtained from the return node index, the element of the successor list is replaced in that plan node and the flow proceeds to the next step (block 883). Subsequently, the act2 is processed and the process is completed as described in "H-1. The Case of Topology including Chain Template".

H-3. The Case of Topology including ANDSplit and ANDJoin Templates

Figure 28:
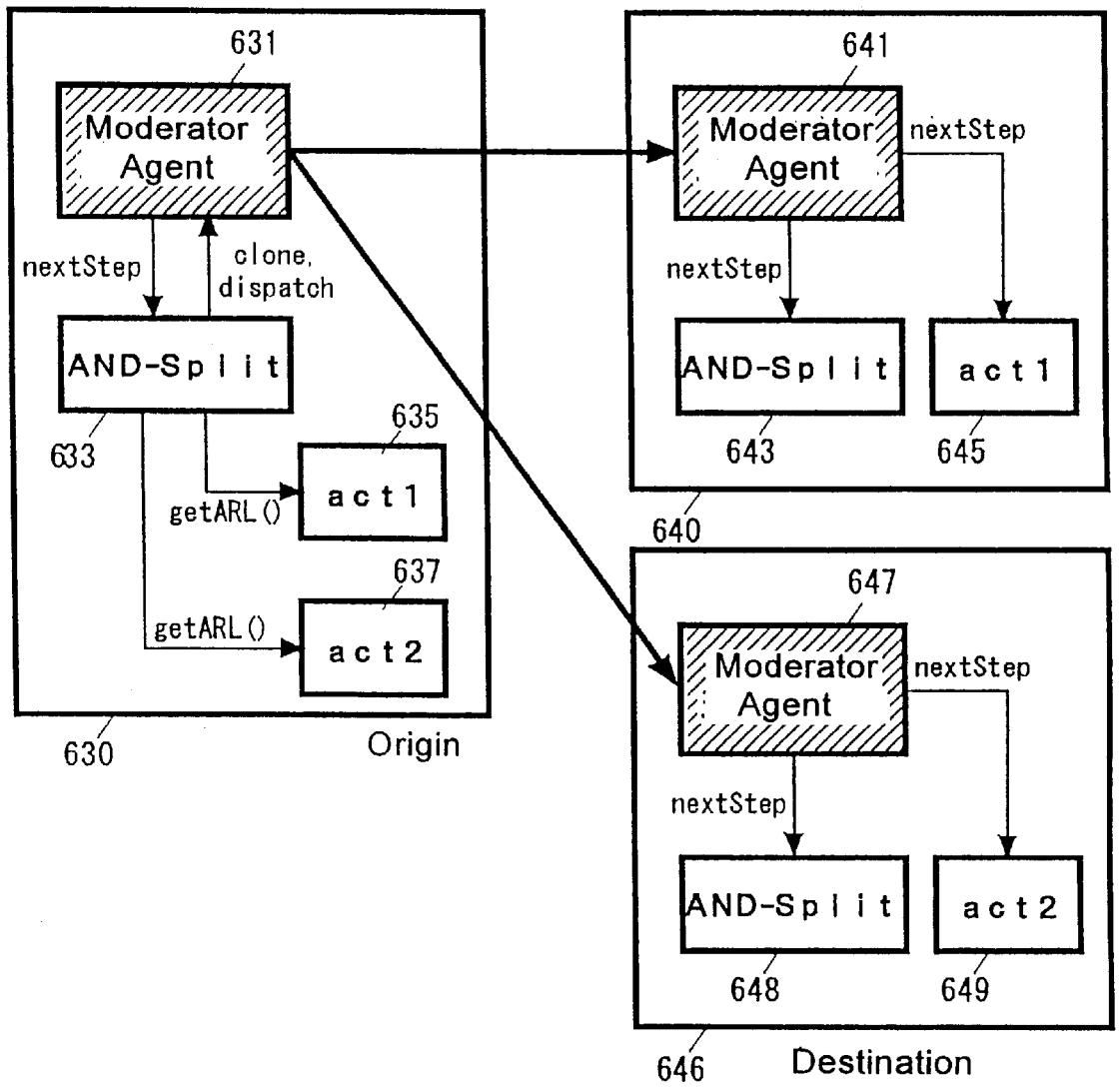
FIG. 28 is a schematic diagram showing the state in which mobile objects in the preferred embodiment of this invention move from an origin place to a destination place.
Figure 29:
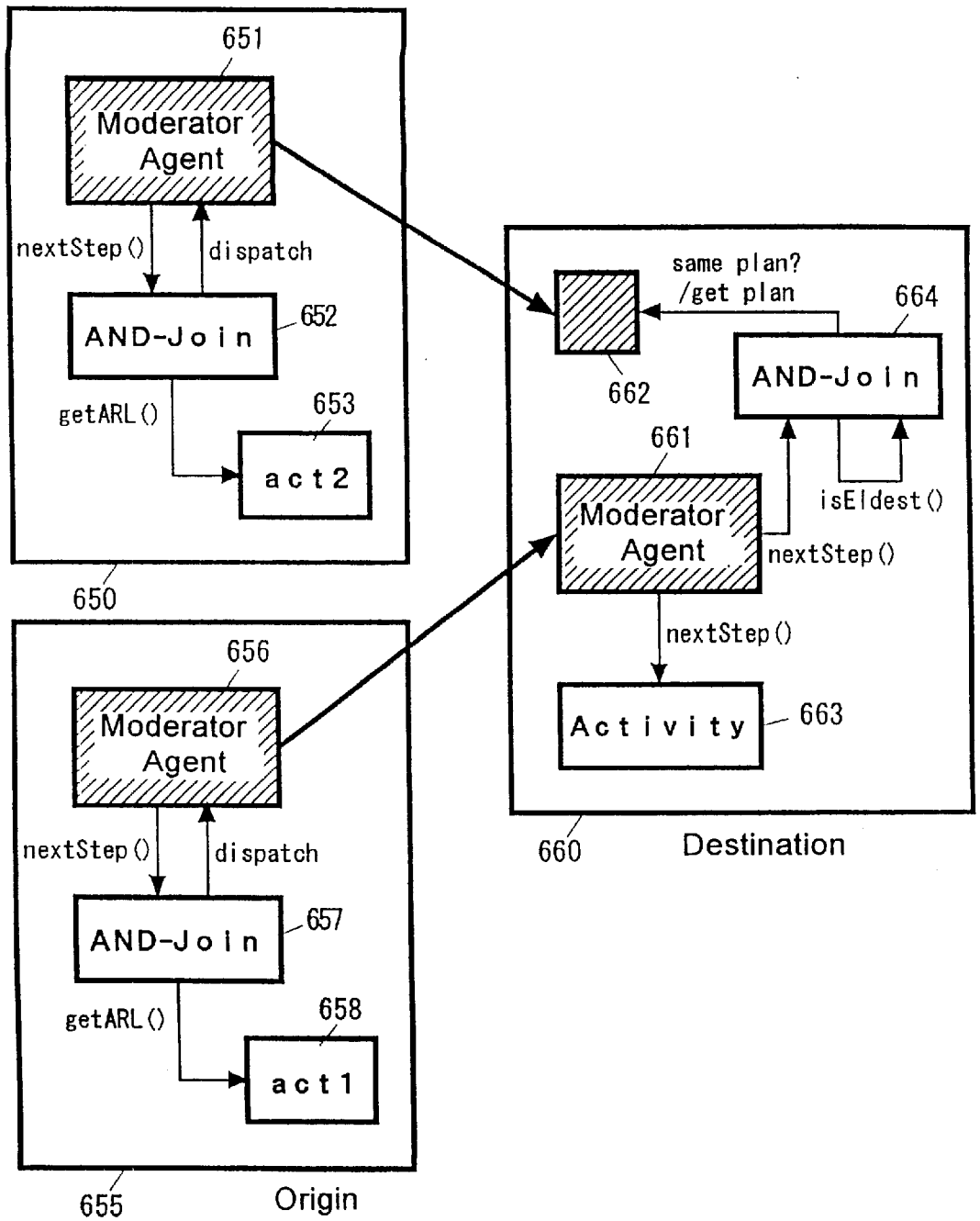
FIG. 29 is a schematic diagram showing the state in which mobile objects in the preferred embodiment of this invention move from an origin place to a destination place.

FIG. 28 and FIG. 29 are diagrams showing a summary of operation of mobile objects which are controlled by the ANDSplit and ANDJoin templates. The case of a topology including the ANDSplit and ANDJoin templates is described hereunder with reference to FIG. 22. Similarly to the case of Chain, the moderator agent 351 is generated, the prepared plan object 353 is then delivered as an argument and the plan 353 is executed step by step.

Figure 30:
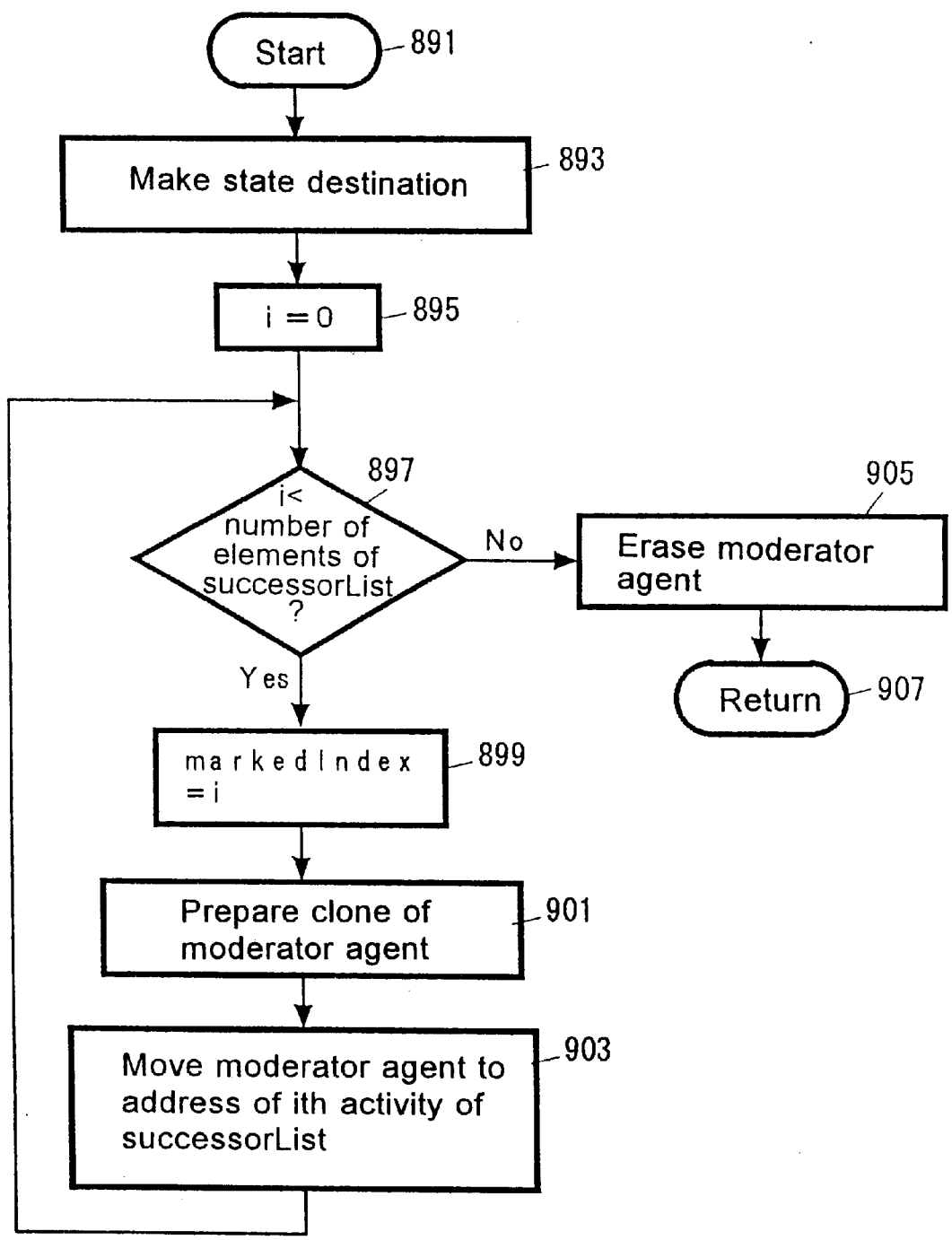
FIG. 30 is a flow chart showing a procedure of processing the ANDSplit template in the origin in the preferred embodiment of this invention.

The plan object 353 takes out ANDSplit which is a plan node of current in the manner similar to the case of Chain. The plan 353 asks the ANDSplit to execute the next step. FIG. 30 is a flow chart showing a procedure of processing the origin in the ANDSplit template. The moderation control manager 603 searches state information of the state control part 601 and acquires information of "origin" which is a default. The moderation control manager 603 asks the moderation module for the origin 605 to process in the origin. The moderation control manager 603 asks the state control part to change the state to destination (block 893). The ANDSplit takes out the first activity of the successor list with reference to the successor list (block 897) and sets "0" in the marked index 595 (block 899).

The moderation control manager 603 then asks the moderator agent 351 to prepare a clone of the moderator agent via the moderator agent reference module 599 (block 901). The moderator agent, responding to this request, also prepares copies of all objects including the moderator agent, a plan, a template and an activity held by the moderator agent. The moderator agent of a clone prepared by a copy tells its own agent ID to the moderator agent reference module 599 in response to completion of preparation of the clone. The moderator agent reference module 599 notifies the moderator module for the origin 605 that preparation of the clone is completed.

The moderator module for the origin 605, responding to this, acquires the address of the activity (act1) corresponding to Value (0) of the marked index from the successor list 609. The moderator module for the origin 605 asks the moderator agent 351 to move the clone to the place corresponding to the address of the act1 via the moderator agent reference module 599 (block 903). The moderator module for the origin 605 determines whether or not the next activity is registered with reference to the successor list 609. If it is registered, the moderator module for the origin 605 prepares another clone by a similar procedure and moves it to the place of the act2 (blocks 897–903). At this time, the marked index 595 of the clone moved to the act2 remains in "1" contrary to the clone moving to the act1 (block 899).

When preparation and movement of the clone moving to the act2 have been processed, the moderator module for the origin 605 determines whether or not the next activity is registered with reference to the successor list 609 (block 897). Because there is no registered activity in the successor list 609 in this example, the moderator module for the origin 605 recognizes that preparation and movement of the clone have been processed. The moderator module for the origin 605, responding to this, sends out an instruction to erase the moderator agent 351 remaining in the original place (place of origin) to the moderator agent 351 via the moderator agent reference module 599 (block 905).

Figure 31:
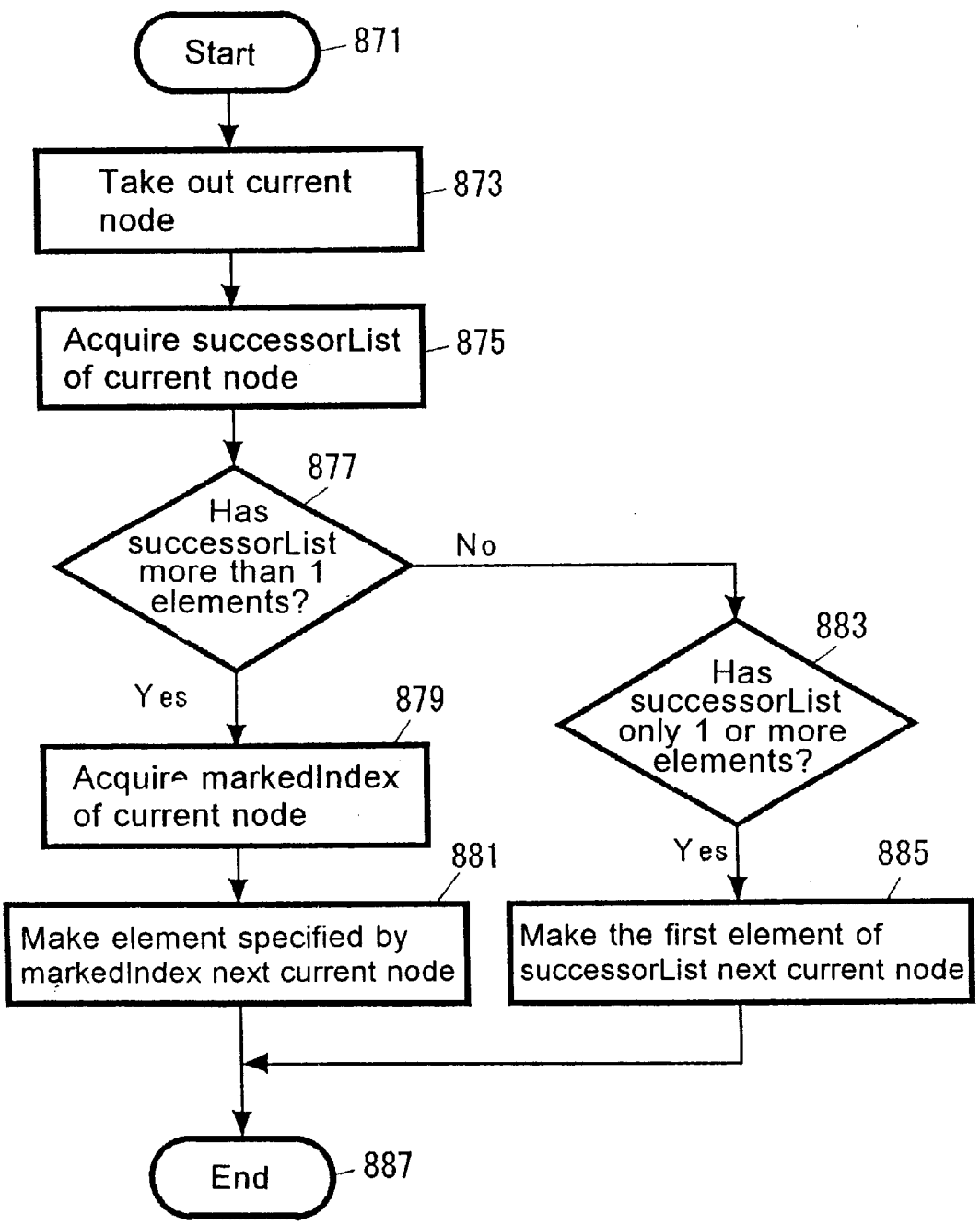
FIG. 31 is a flow chart showing a logic to decide a current node in the preferred embodiment of this invention.

On the other hand, the moderator agent of the clone executes the next plan step in respective places. At this time, ANDSplit is taken out again as a current node. A flow chart of a logic deciding the next current is shown in FIG. 31. The moderation control manager 603 acquires state information with reference to the state control part 601, recognizing that the current state is destination, and asks the moderation module for the destination 607 to execute the process.

The moderation control manager 603 restores the information of the state to the state of the origin. When the plan affirms completion of processing the destination of the ANDSplit, it takes out a plan node corresponding to the marked index (act1 or act2) and asks execution of the activity. The plan object 353 takes out the node of the next current with reference to the plan iterator 352. At this time, the plan iterator examines the registered value with reference to the successor list 609 and the marked index 595 (FIG. 31).

The act1 and the act2 acquire the Result which is held by the activity previously executed. In this example, because no activity was executed in advance to the ANDSplit template, the act1 and the act2 will not eventually obtain the Result held by the previously executed activity. At first, ANDJoin is selected as a next current node in the agent of a clone corresponding to the act1. The plan object 353 asks the moderator control manager 603 of the ANDJoin template to execute the next step. The moderator control manager 603 recognizes that the current origin should be processed from the information of the state control part 601 and issues an execution request to the moderation module for the origin 605. It also asks the state control part 601 to change the state.

The moderation module for the origin 605 acquires address information of the activity (act3) which is registered in the successor list 609 with reference to the successor list 609 and instructs the moderator agent 351 to move to the place corresponding to the acquired address information via the moderator agent reference module 599.

The agent of the clone corresponding to the act2 also processes in a manner similar to the case of the act1 and moves to the place of the act3. Because the two moderator agents arrived at a new place, they execute the next steps, respectively. The plan object 353 takes out ANDJoin template as a current node and executes the next step.

Figure 32:
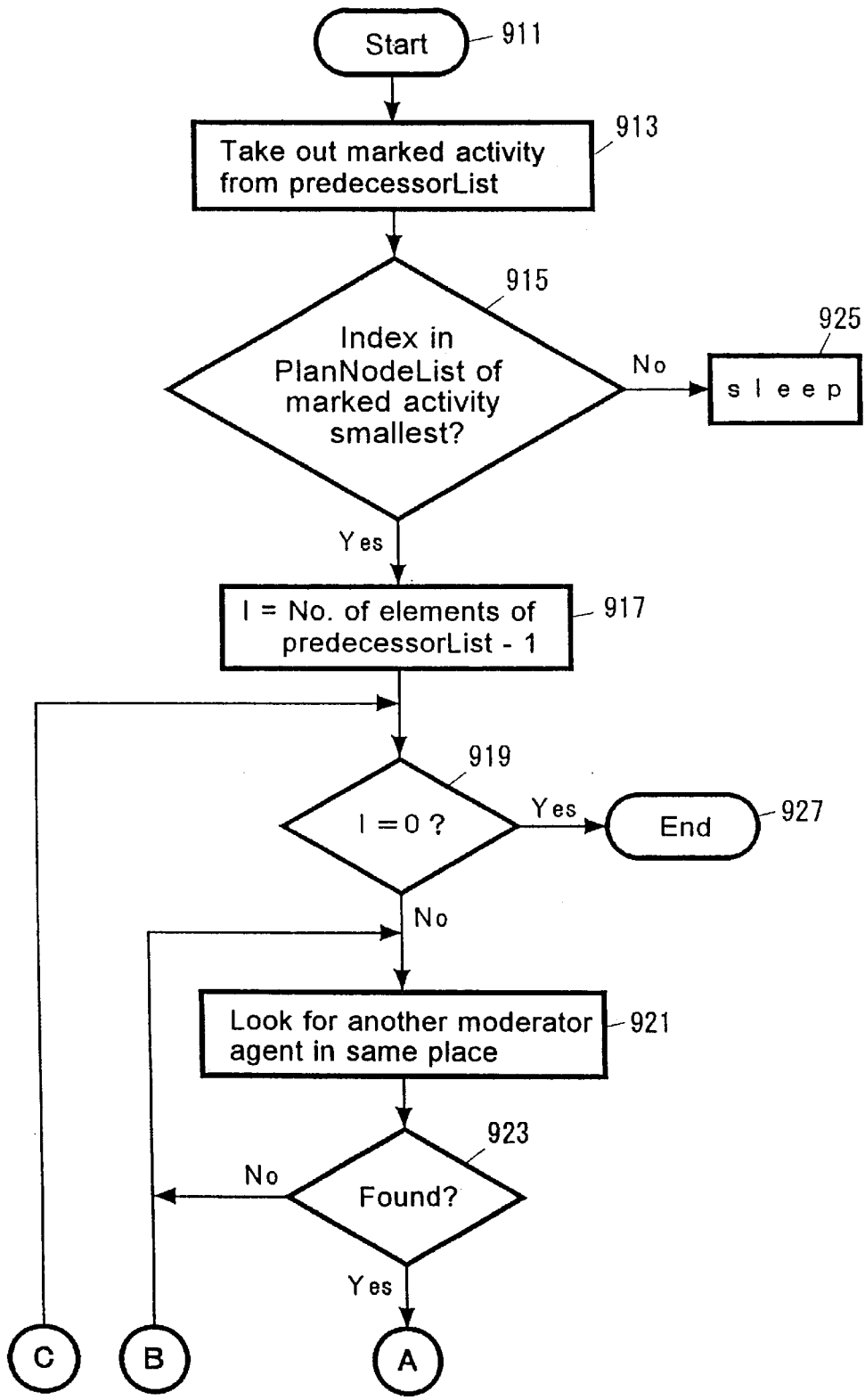
FIG. 32 is a flow chart showing a procedure of processing the ANDJoin template in the destination in the preferred embodiment of this invention.
Figure 33:
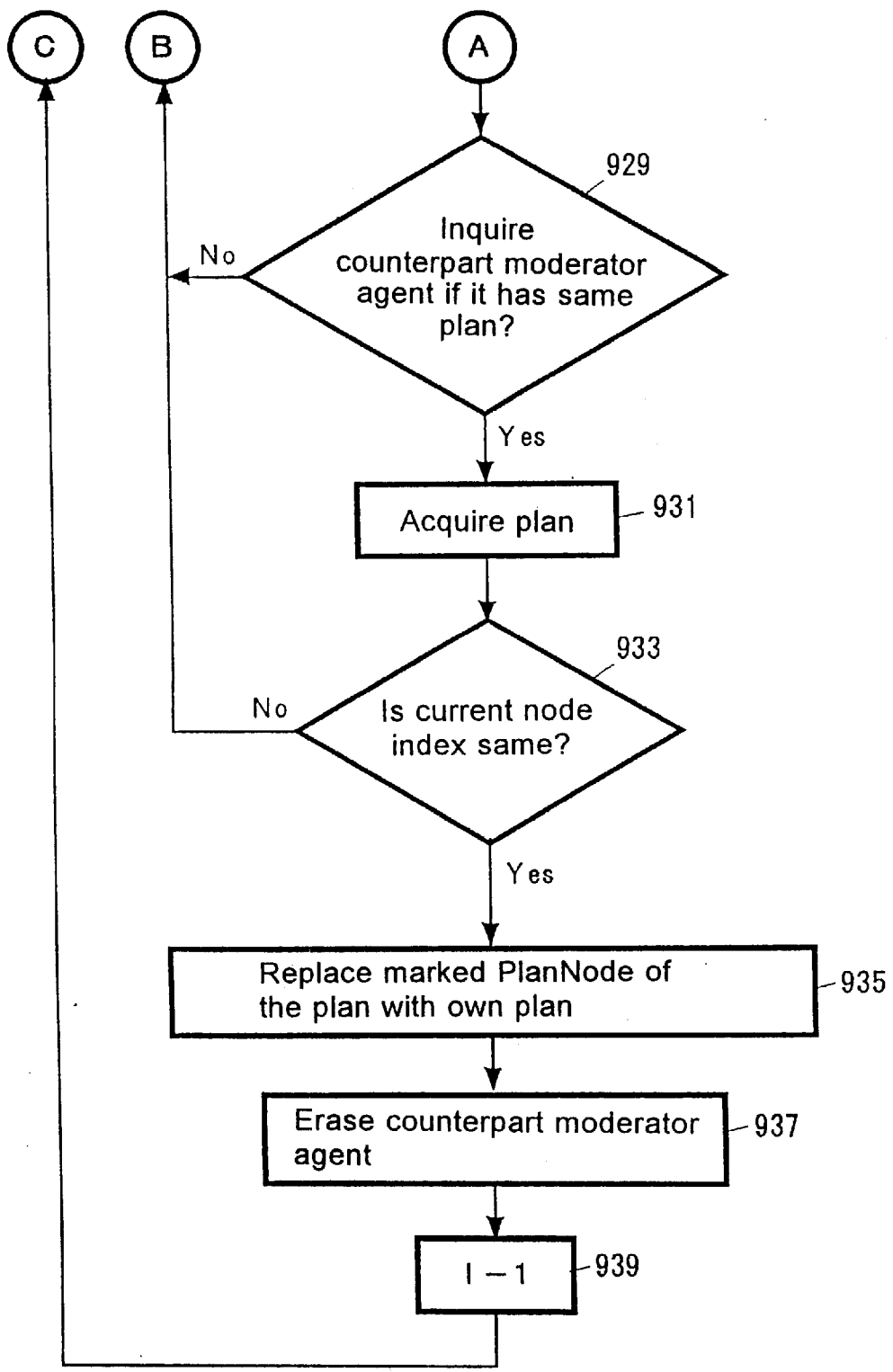
FIG. 33 is a flow chart showing a procedure of processing the ANDJoin template in the destination in the preferred embodiment of this invention.

FIG. 32 and FIG. 33 are flow charts showing a procedure of processing in the destination of the ANDJoin template. The moderation control manager 603 of the ANDJoin determines that the current state is the destination with reference to the state control part 601 and asks the moderation module for the destination 607 to execute. Each moderation control manager 603 restores the state to the state of origin. The moderation module for the destination 607 of the clone corresponding to the act1 takes out the activity marked with completion (act1 in this case) with reference to the predecessor list 591 (block 913). It is determined whether or not the taken out activity has the least index in the predecessor index list (block 915) and, if it is determined that it has the least index, receives the Result of other clone agents.

Specifically, the moderation module for the destination 607 asks a same place agent reference module 597 to acquire an agent list existing in the same place. The same place agent reference module 597, responding to this, issues an instruction "getAgentList" to the place 360 for inquiry. The place returns AgentList to acquire the list of agents existing in the same place. The same place agent reference module 597 delivers the list to the moderation module for the destination 607. The moderation module for the destination 607 looks for an agent which has the same plan ID from the list (block 921).

When an agent which has the same plan ID is found, the plan of that agent is acquired. The current node of the acquired plan is then examined (block 929) and the Result of that agent is received if it is the same ANDJoin. In the preferred embodiment of this invention, it is further determined whether or not the current node index is same (blocks 931, 933) and enters a process of merging only if it is same. This is done for preventing the subject to be processed of the ANDJoin from failing to be recognized. The moderation module for the destination 607 finds how many predecessors exist with reference to the predecessor list and receives as many Results as the number of the predecessors.

Figure 34:
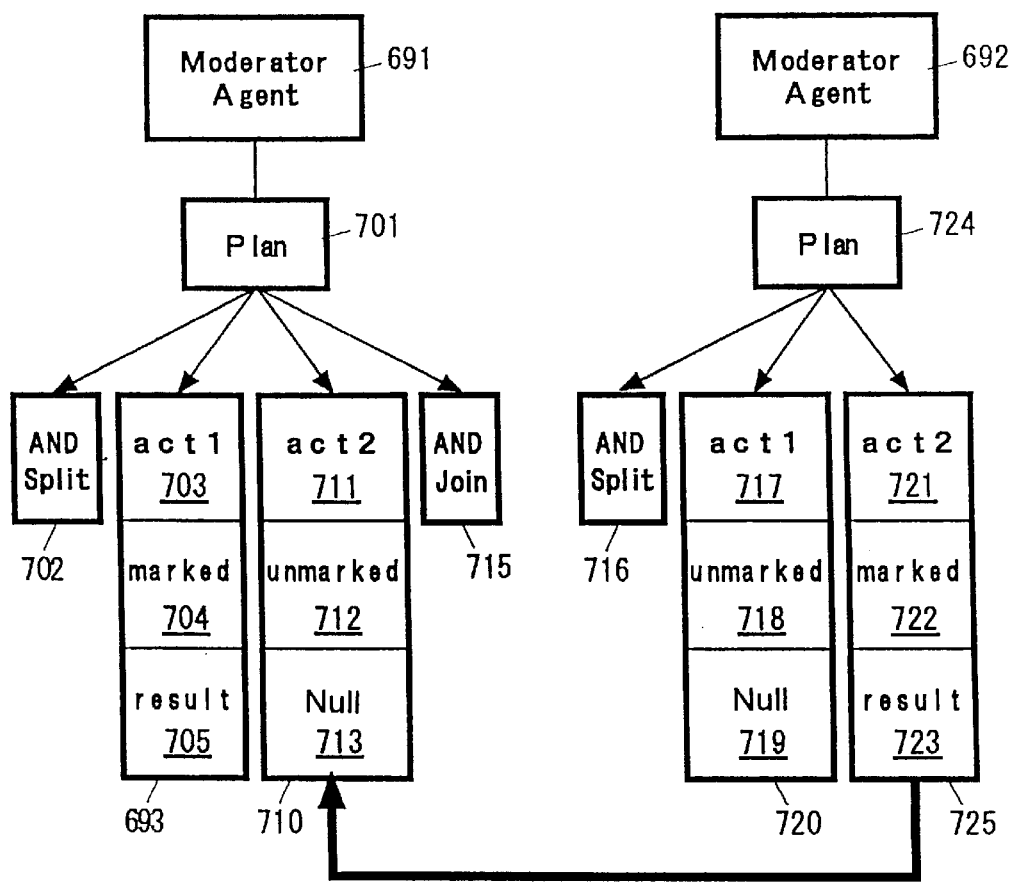
FIG. 34 is a diagram showing a summary of process in which a mobile object in the preferred embodiment of this invention receives Result.

Specifically, the moderation module for the destination 607 takes out an activity marked completion with reference to the predecessor list 591 of the received plan and receives the Result held by that activity. The Result is set to the Result of the corresponding activity. The plan node itself may be replaced (block 935). FIG. 34 is a diagram showing a summary of the process of receiving the Result.

After the moderation module for the destination 607 detects completion of setting the Result, it issues an instruction to the counterpart moderator agent 351 indicating to erase via the moderator agent reference module (block 937). The counterpart moderator agent, in receiving this instruction, erases the moderator agent and objects it controls (plan, template and activity, etc.).

On the other hand, the agent corresponding to the act2 executes the next step upon arrival at the new place. The moderation module for the destination 607 of this agent also takes out the activity marked completion (act2 in this case) with reference to the predecessor list 591 (block 913). It is determined whether or not the taken out activity has the least index in the predecessor index list (block 915) and it is determined that it is not the least index. In this case, a Sleep state is entered to wait delivery of the Result of other clone agent (block 925).

Returning back to the clone corresponding to the act1, the moderation module for the destination 607 receives as many Results as the number of the predecessor lists (the number of elements of the predecessor list −1) and the plan takes out the next plan node (act3) and asks to execute the activity after completing erasure of the clone. The act3 acquires the result which the act1 and the act2 internally hold. In the preferred embodiment of this invention, the moderation module for the destination 607 issues an instruction "getResult" to the act1 and the act2 (of the clone corresponding to the act1) asking to send the result of processing. The act1 and the act2, responding thereto, send out the Result which they hold. The act3 obtains a reference to an agent existing in the same place (a report agent in this example) using the class name of the internally held agent as a key. The act3 sends an internally held message to the report agent with the result obtained from the act1, act2 being an argument.

The plan takes out the next current node. Because the current node does not exist in this case, the plan detects this and ends processing. The moderator agent detects the end of processing and erases the moderator agent and objects which it controls, ending processing.

H-4.The Case of Topology including ORSplit Template

Figure 35:
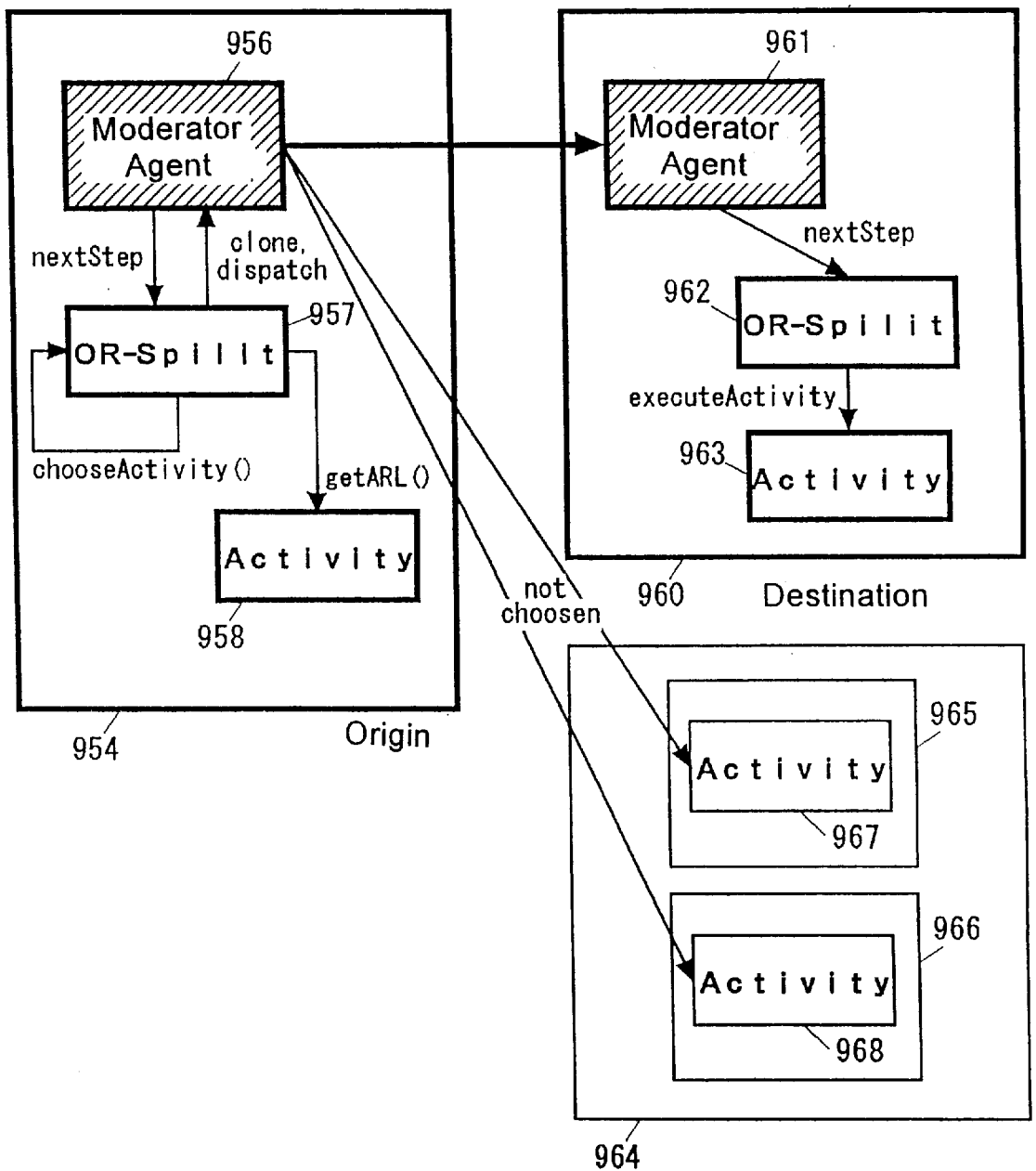
FIG. 35 is a schematic diagram showing the state in which the mobile objects move from the origin place to the destination place in the preferred embodiment of this invention.
Figure 36:
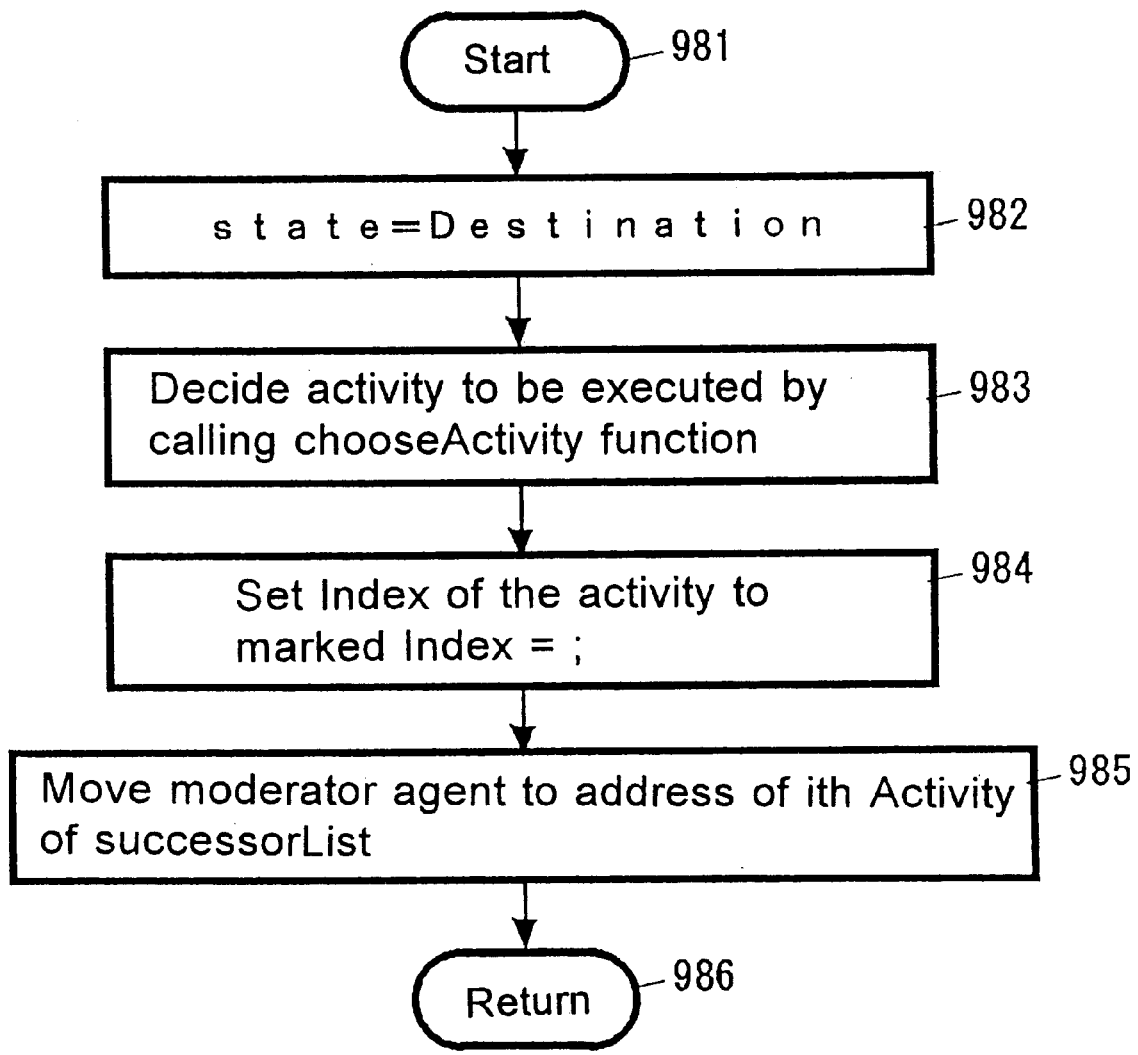
FIG. 36 is a flow chart showing a procedure of processing the ORSplit in the origin in the preferred embodiment of this invention.

FIG. 35 is a diagram showing a summary of operation of the mobile objects which are controlled by ORSplit template. In the case of ORSplit, the origin is processed as shown in FIG. 36 in contrast to the case of Chain and ANDSplit. The ORsplit template has one predecessor activity and a plurality of successor activities. In the original place, one activity is selected from the successor list by a method "chooseActivity" being called upon and only that selected activity is executed.

In processing the origin of the ORSplit, the state is changed to the destination first of all (block 982). Function "chooseActivity" is then called upon and an activity to be executed which meets a predetermined condition is selected (block 983). The index of that activity becomes a marked index (block 984). The address of the selected activity is acquired and the moderator agent 351 is requested to move to that address (block 985).

H-5. The Case of Topology including ORJoin Template

Figure 37:
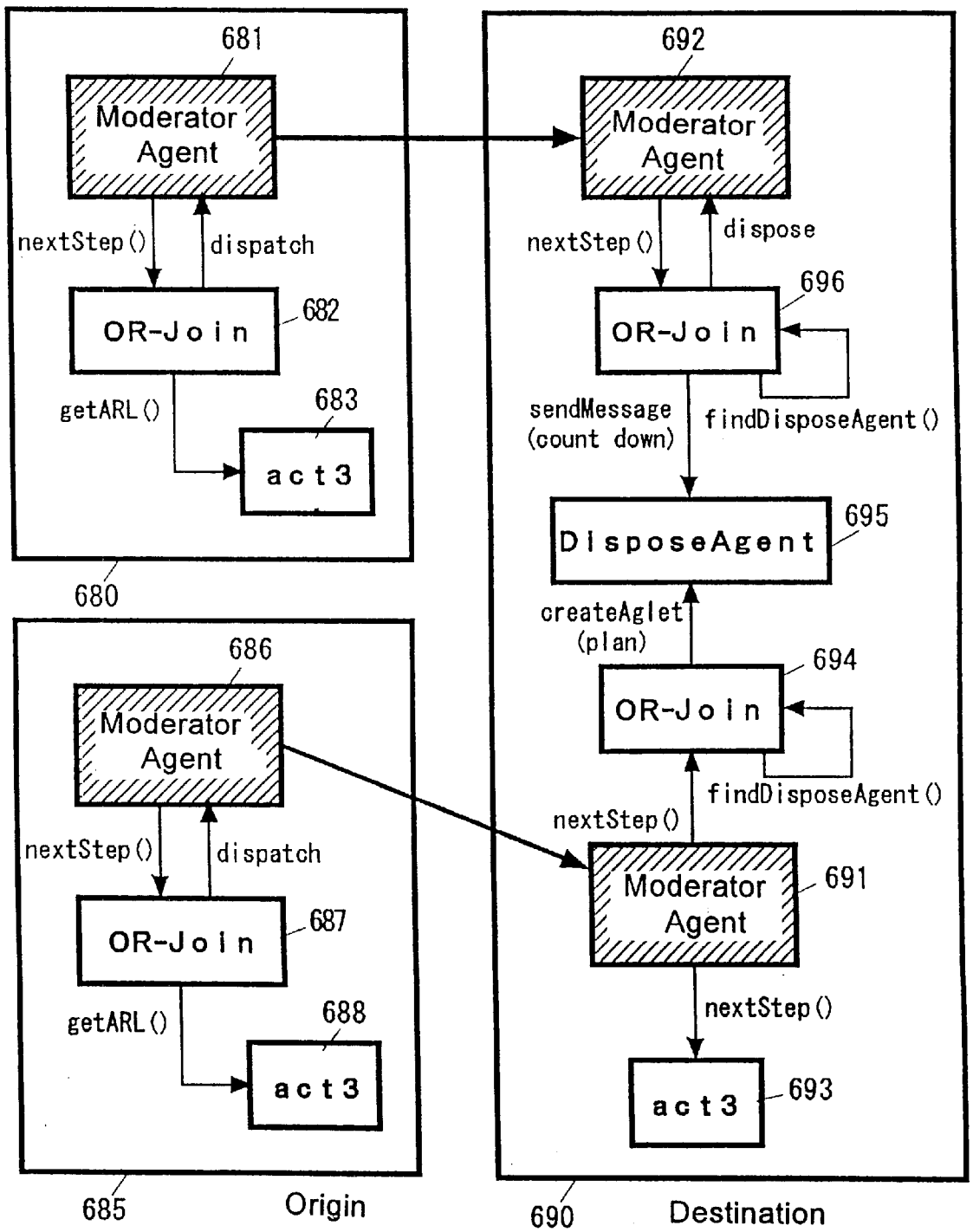
FIG. 37 is a schematic diagram showing the state in which the mobile objects move from the origin place to the destination place in the preferred embodiment of this invention.
Figure 38:
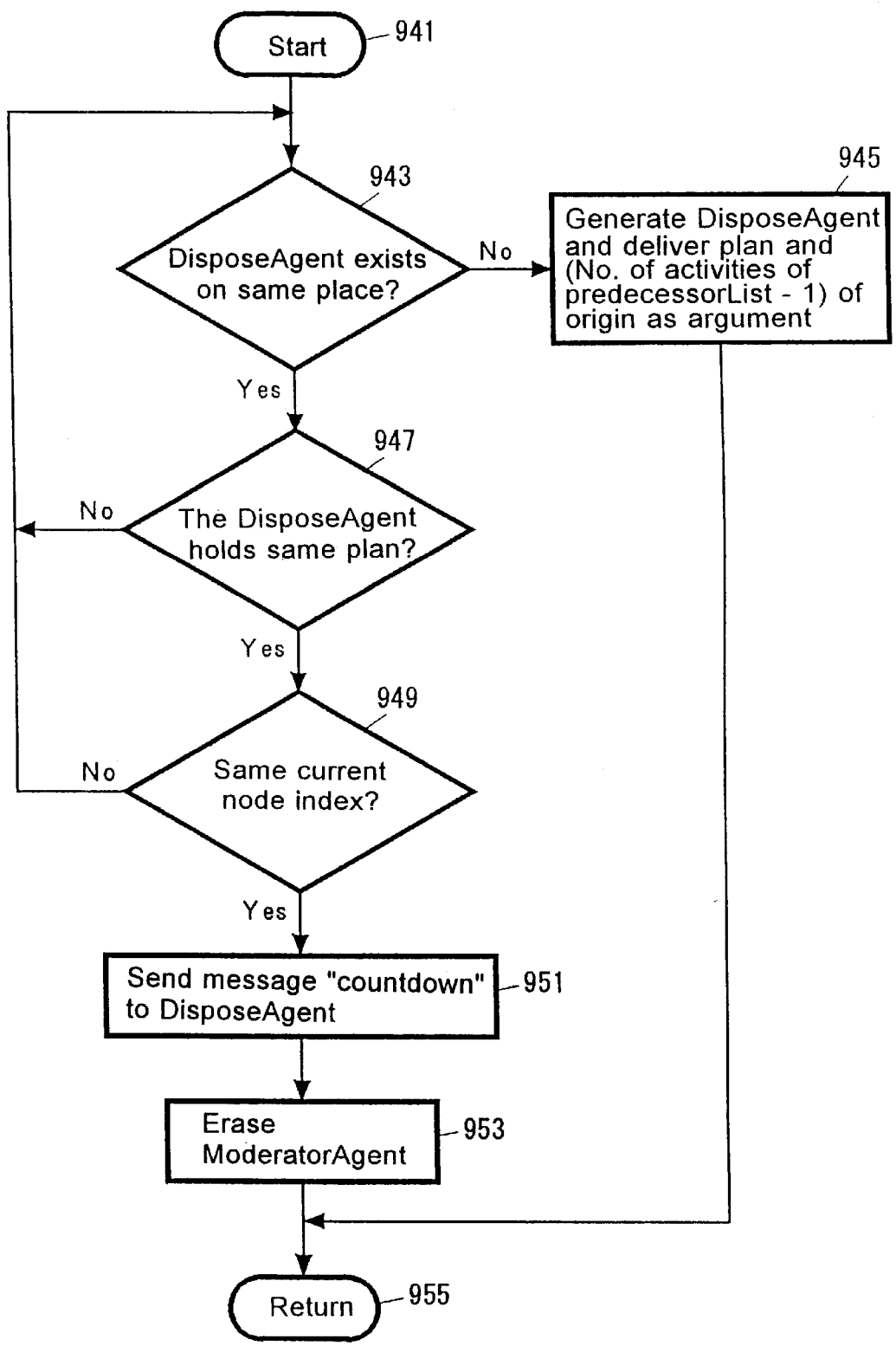
FIG. 38 is a flow chart showing a procedure of processing the ORJoin in the destination in the preferred embodiment of this invention.

FIG. 37 is a diagram showing a summary of operation of the mobile objects which are controlled by ORJoin template. In the case of ORJoin, the destination is processed as shown in FIG. 38 in contrast to the case of Chain and ANDJoin. The ORJoin template has a plurality of predecessor activities and one successor activity. In the destination, The ORJoin performs a process in which the mobile agent arriving first generates a Dispose agent while erasing other mobile agents.

The ORJoin template 694 of the mobile objects arriving first at the destination 690 sends out a method "findDisposeAgent" to determine whether or not a Dispose agent exists in the same place (block 943). If it does not exist, a Dispose agent which erases other agents is generated (block 945). The plan and the number of activities of the predecessor list −1 are delivered as an argument at this time. The Dispose agent waits for the mobile object of "the number of activities of the predecessor list −1" to erase that object and erases itself after it fulfilled its role. While the condition to survive depends on whether or not an object arrived first at the destination 690 in the preferred embodiment of this invention, the content of the Result may be the condition to continue to be processed.

On the other hand, the ORJoin templates 696 of other mobile objects similarly send out a method "findDisposeAgent" to determine whether or not a Dispose agent exists on the same place (block 943). Because a Dispose agent already exists in this case, a process of being erased by the Dispose agent is entered. Specifically, it is determined whether or not the Dispose agent holds a same plan (block 947) or a same current node index (block 949) to affirm that it is the Dispose agent to be erased.

When it is affirmed that the Dispose agent is one which should be erased, a message "countdown" is sent to the Dispose agent to decrease the number of processes of the Dispose agent (block 951). The ORJoin template 696 then sends a dispose request to the moderator agent 692 to extinguish it.

While the preferred embodiment of this invention also provides a part Join template which has a plurality of predecessor activities and a plurality of successor activities less than the predecessor activities, description of such template is omitted because such template may be implemented by a combination of the above described template. For example, the part Join template may be implemented by a combination of a plurality of predecessor activities, an ORJoin template linking to one successor activity, an activity to determine that a desired number of ORJoin templates have been executed, an Iteration template returning to the ORJoin template depending on determination of whether or not the latter activity cleared a desired condition, a dummy activity and an ANDSplit splitting into a desired number.

As described in the above, this invention allows a mobile agent to be developed with a reduced amount of development labor and time of a programmer without requiring a high level programming knowledge. Also, the development labor and time required for developing a mobile agent can be reduced as far as possible. Further, this invention can provide a user friendly environment of developing a mobile agent which allows a developer to intuitively grasp the functions thereof.

The invention has been described with reference to several specific embodiments. one having skill in the relevant art will recognize that modifications may be made without departing from the spirit and scope of the invention as set forth in the appended claims.

Having thus described our invention, what we claim as new and desire to secure by Letters Patent is:

1. A method of executing mobile objects for executing different jobs in different places distributed on a network, comprising the steps of:

(a) generating a first carrier agent which holds a first concrete activity defining a first job to be executed in a first place;

(b) generating a second carrier agent which holds a second concrete activity defining a second job to be executed in a second place;

(c) generating a substance of mobile objects which contains first information specifying said first carrier agent and second information specifying said second carrier agent, instructs said first carrier agent to execute said first concrete activity in said first place, and instructs said second carrier agent to execute said second concrete activity in said second place;

(d) moving said first carrier agent to said first place;

(e) moving said second carrier agent to said second place;

(f) moving said substance of said mobile objects to said first place;

(g) executing said first job of said first concrete activity in said first place by having the substance of said mobile objects specify said first carrier agent and instruct said first concrete activity to execute said first job;

(h) moving the substance of said mobile objects to said second place; and (i) executing said second job of said second concrete activity in said second place by having the substance of said mobile objects specify said second carrier agent and instruct said second concrete activity to execute said second job.

2. A method of executing mobile objects for executing a job in at least one place distributed on a network, comprising the steps of:

(a) generating a carrier agent which holds a concrete activity defining a job to be executed in said place;

(b) generating a substance of mobile objects which contains information specifying said carrier agent and instructs said carrier agent to execute said concrete activity in said place;

(c) moving said carrier agent to said place;

(d) moving the substance of said mobile objects to said place; and (e) executing a job of said concrete activity in said place by having the substance of said mobile objects specify said carrier agent and instruct said concrete activity to execute the job.

3. A method of executing mobile objects for executing a job in at least one place distributed on a network, comprising the steps of:

(a) moving a carrier agent which holds a concrete activity defining a job to be executed in said place to said place;, (b) moving the substance of mobile objects which contains information specifying said carrier agent and instructs said carrier agent to execute a job of said concrete activity in said place to said place; and (c) executing the job of said concrete activity in said place by having the substance of said mobile objects specify said carrier agent and instruct said concrete activity to execute the job.

4. A recording medium for storing at least a portion of mobile objects executing different jobs in different places distributed on a network, comprising:

(a) a first carrier agent which holds a first concrete activity defining a first job to be executed in a first place;

(b) a second carrier agent which holds a second concrete activity defining a second job to be executed in a second place; and (c) at least one substance of mobile objects which contains information specifying said first carrier agent and a second information specifying said second carrier agent, instructs said first carrier agent to execute the job of said first concrete activity in said first place, and instructs said second carrier agent to execute the job of said second concrete activity in said second place.

5. A recording medium storing mobile objects for executing a job in places distributed on a network, comprising:

(a) carrier agent which holds a concrete activity defining a job to be executed in said place; and (b) at least one substance of mobile objects which contains information specifying said carrier agent and instructs said carrier agent to execute a job of said concrete activity in said place.

6. A recording medium for storing at least a portion of mobile objects executing different jobs in different places distributed on a network, comprising:

(a) a first proxy activity which contains information specifying said first carrier agent which holds a first concrete activity defining a job to be executed in a first place, and instructs said first carrier agent to execute the job of said first concrete activity in said first place;

(b) a second proxy activity which contains information specifying said second carrier agent which holds a second concrete activity defining a job to be executed in a second place, and instructs said second carrier agent to execute the job of said second concrete activity in said second place; and (c) an order list defining the order of execution of said first proxy activity and said second proxy.

7. A recording medium for storing mobile objects executing jobs in response to an instruction by substances of mobile objects including proxy activities arriving at a place distributed on a network, comprising:

(a) a concrete activity defining a job to be executed in said place;

(b) a concrete activity table provided to said proxy activity in order for said proxy activity to specify said concrete activity; and (c) a method for receiving an instruction message to execute the job from said proxy activity.

8. A recording medium for storing mobile objects executing jobs in response to an instruction by substances of mobile objects including proxy activities arriving at a place distributed on a network, comprising:

(a) a concrete activity defining a job to be executed in said place; and (b) a method for receiving an instruction message to execute the job from said proxy activity.

* * * * *